US008611716B2

(12) United States Patent
DeMeritt et al.

(10) Patent No.: US 8,611,716 B2
(45) Date of Patent: Dec. 17, 2013

(54) CHANNELED SUBSTRATES FOR INTEGRATED OPTICAL DEVICES EMPLOYING OPTICAL FIBERS

(75) Inventors: Jeffery Alan DeMeritt, Painted Post, NY (US); Richard Robert Grzybowski, Corning, NY (US); Brewster Roe Hemenway, Jr., Painted Post, NY (US); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 424 days.

(21) Appl. No.: 12/570,523

(22) Filed: Sep. 30, 2009

(65) Prior Publication Data

US 2011/0075965 A1 Mar. 31, 2011

(51) Int. Cl.
*G02B 6/00* (2006.01)

(52) U.S. Cl.
USPC ............ 385/137; 385/130; 385/131; 385/132

(58) Field of Classification Search
USPC .................................. 385/130, 131, 132, 137
See application file for complete search history.

(56) References Cited

U.S. PATENT DOCUMENTS

| | | | | |
|---|---|---|---|---|
| 4,192,575 | A | 3/1980 | Hodge | 350/96.21 |
| 5,357,103 | A | 10/1994 | Sasaki | 250/227.24 |
| 5,764,832 | A * | 6/1998 | Tabuchi | 385/49 |
| 6,215,946 | B1 | 4/2001 | Sherrer | 385/137 |
| 6,260,388 | B1 | 7/2001 | Borrelli et al. | 65/393 |
| 6,389,202 | B1 | 5/2002 | Delpiano et al. | 385/49 |
| 6,504,107 | B1 * | 1/2003 | Kragl | 174/260 |
| 6,736,552 | B2 | 5/2004 | Martwick | 385/88 |
| 6,744,948 | B1 * | 6/2004 | Pi et al. | 385/30 |
| 6,754,407 | B2 | 6/2004 | Chakravorty et al. | 385/14 |
| 6,866,426 | B1 | 3/2005 | Steinberg et al. | 385/83 |
| 6,869,229 | B2 | 3/2005 | Reedy et al. | 385/88 |
| 6,955,481 | B2 | 10/2005 | Colgan et al. | 385/89 |
| 7,049,704 | B2 | 5/2006 | Chakravorty et al. | 257/778 |

(Continued)

FOREIGN PATENT DOCUMENTS

| | | |
|---|---|---|
| DE | 4445997 | 12/1994 |
| EP | 0211976 | 11/1989 |

(Continued)

OTHER PUBLICATIONS

Heckele et al Article; "Hot Embossing and Injection Molding for Microoptical Components"; SPIE; vol. 3135; p. 24-29.

(Continued)

*Primary Examiner* — Jennifer Doan
(74) *Attorney, Agent, or Firm* — Matthew J. Mason; Joseph Gortych

(57) ABSTRACT

A channeled substrate for forming integrated optical devices that employ optical fibers and at least one active optical component is disclosed. The channeled substrate includes a substrate member having an upper surface one or more grooves formed therein, and a transparent sheet. The transparent sheet, which is preferably made of thin glass, is fixed to the substrate member upper surface to define, in combination with the one or more grooves, one or more channels. The channels are each sized to accommodate an optical fiber to allow for optical communication through the transparent sheet between the active optical component and the optical fibers. Channeled substrates formed by molding and by drawing are also presented. Integrated optical devices that employ the channeled substrate are also disclosed.

4 Claims, 30 Drawing Sheets

(56) References Cited

U.S. PATENT DOCUMENTS

| | | | | |
|---|---|---|---|---|
| 7,062,144 | B2 | 6/2006 | Hwang et al. | 385/139 |
| 7,125,176 | B1 | 10/2006 | Stafford et al. | 385/94 |
| 7,149,376 | B2 | 12/2006 | Uchida et al. | 385/15 |
| 7,242,823 | B2 | 7/2007 | Karashima et al. | 385/14 |
| 7,522,807 | B2 * | 4/2009 | Rolston et al. | 385/137 |
| 7,684,661 | B2 * | 3/2010 | Nakamura | 385/14 |
| 2002/0072111 | A1 | 6/2002 | Clarkin et al. | 435/287.1 |
| 2002/0131727 | A1 | 9/2002 | Reedy et al. | 385/88 |
| 2006/0153512 | A1 | 7/2006 | Falkenstein et al. | 385/125 |
| 2011/0110625 | A1 * | 5/2011 | Chatigny | 385/29 |

FOREIGN PATENT DOCUMENTS

| | | |
|---|---|---|
| EP | 0535690 | 10/1992 |
| GB | 674223 | 4/1949 |
| GB | 1234717 | 9/1969 |
| JP | 9090151 | 4/1997 |
| JP | 11003649 | 1/1999 |
| WO | 89/08274 | 9/1989 |
| WO | 99/05550 | 2/1999 |
| WO | 2008/005488 | 1/2008 |

OTHER PUBLICATIONS

Heckele et al Article; "Review on micro molding of thermoplastic polymers"; Journal of Micromechanics and Microengineering; 2004; R1-R14.

* cited by examiner

CHANNELED SUBSTRATES FOR INTEGRATED OPTICAL DEVICES EMPLOYING OPTICAL FIBERS

FIELD

The present disclosure relates to integrated optical devices, and in particular to substrates used to form integrated optical devices that employ optical fibers.

DESCRIPTION OF RELATED ART

Certain types of integrated optical devices combine active optical components, active electrical components, and passive waveguides in the form of optical fibers. Examples of such integrated optical devices include optical transceivers and active cable assemblies (ACAs).

While active alignment of the optical fibers to the active optical components ensures optimum performance of the integrated optical device, it is preferred that the alignment be passive to reduce cost and complexity. Further, it is preferred that standard packaging techniques known in the art be used to form the integrated optical device.

Practical integrated optical devices are fabricated using standard packaging techniques to minimize cost. In general, active optical components may be attached active side up on the substrate and electrically interconnected with wirebonds. In this case, their optical paths are, in certain embodiments, directed upward away from the substrate. In another approach, the active optical components are flip-chip mounted on the substrate so that their optical paths are oriented downward into the substrate or upward through a transparent medium such as a glass window.

Of these two options, the flip-chip mounting approach has several advantages, such as the interface between the active optical components and the optical fibers being protected from the surrounding environment. Also, the optical interface is mechanically stabilized by the carrier substrate, and the electrical links to other devices are short, enabling high-frequency operation. However, a major challenge with the flip-chip mounting approach involves the need to passively align optical fibers beneath the active optical components, and to provide low-loss coupling to the optical fibers.

SUMMARY

An aspect of the disclosure is a channeled substrate for forming integrated optical devices that employ one or more optical fibers and at least one active optical component. The channeled substrate includes a substrate member having an upper surface with one or more grooves formed therein. The substrate also includes a transparent sheet fixed to the substrate member upper surface and that defines, in combination with the one or more grooves, one or more channels each sized to accommodate one of the one or more optical fibers to allow for optical communication through the transparent sheet between the active optical component and the one or more optical fibers.

Another aspect of the disclosure is a channeled substrate for forming integrated optical devices that employ one or more optical fibers and an active optical component. The channeled substrate includes a substrate member having a planar upper surface. The channeled substrate also includes a transparent sheet having one or more grooves formed therein and fixed to the substrate upper surface to define, in combination with the planar substrate upper surface, one or more channels each sized to accommodate one of the one or more optical fibers to allow for optical communication through the transparent sheet between the active optical component and the one or more optical fibers.

Another aspect of the disclosure is a method of forming a channeled substrate for forming integrated optical devices that employ one or more optical fibers and an active optical component. The method includes providing a substrate member having an upper surface, and providing a transparent sheet having opposing surfaces. The method also includes forming one or more grooves in one of the transparent sheet surfaces. The method further includes interfacing the grooved transparent sheet surface with the substrate member upper surface to define one or more channels each sized to accommodate one of the one or more optical fibers to allow for optical communication through the transparent sheet between the active optical component and the one or more optical fibers.

Another aspect of the disclosure is a method of forming a channeled substrate for integrated optical devices that employ optical fibers and an active optical component. The method includes forming a cylindrical glass preform having a substantially rectangular-shaped cross-section and a plurality of channels formed therein. The method also includes drawing the preform to form a cylindrical rod portion smaller than the preform and having substantially the same relative dimensions as the preform, wherein the rod portion channels are sized to accommodate the optical fibers. The method further includes cutting a section of the rod portion to obtain the channeled substrate.

These and other advantages of the disclosure will be further understood and appreciated by those skilled in the art by reference to the following written specification, claims and appended drawings.

BRIEF DESCRIPTION OF THE DRAWINGS

A more complete understanding of the present disclosure may be had by reference to the following detailed description when taken in conjunction with the accompanying drawings wherein.

DETAILED DESCRIPTION

Reference is now made in detail to the present preferred embodiments of the disclosure, exemplary embodiments of which are illustrated in the accompanying drawings. Whenever possible, the same or like reference numbers and symbols are used throughout the drawings to refer to the same or like parts.

Examples of the present disclosure are directed to various substrates, and methods of using the substrates to passively align arrays of optical fibers with active optical components in integrated optical devices such as low-cost optoelectronic transceivers and ACAs. Example integrated optical devices that employ the substrates of the present disclosure are also described.

The active optical components may be in the form of light sources and include, for example, commercially available arrayed semiconductor laser sources such as edge-emitting light sources (e.g., Fabry-Perot, distributed feedback, ring lasers, etc.) or surface-emitting light sources such as vertical-cavity surface-emitting lasers (VCSELs). Active optical components that emit light are referred to below as "transmitter active optical components." Active optical components may also be in the form of active optical modulators and include, for example, spatial light modulators, optical phase modulators, electro-absorption modulators, injection-locked optical modulators, optical transistors, free carrier absorption modulators, liquid crystal modulators and semiconductor optical amplifiers, and are generally referred to below as "optical modulators." Active optical components may also be in the form of detectors or receivers and include, for example, detector arrays such as PIN photodiodes, and are generally referred to below as "receiver active optical components."

In the discussion below, "wafer scale" means a size sufficient to make multiple members, devices or assemblies on a single structure (such as a semiconductor wafer), which is then diced to recover the individual members, devices or assemblies.

Figure 1:
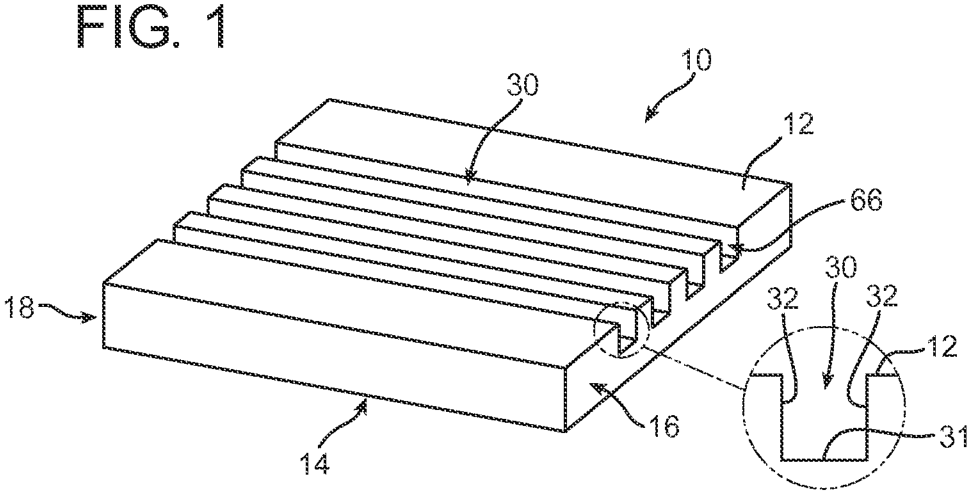
FIG. 1 is a perspective view of an example substrate member showing precision grooves formed therein.

FIG. 1 is a perspective view of an example substrate member 10 having an upper surface 12, a lower surface 14, and front and back ends 16 and 18. Cartesian coordinates are shown for the sake of reference, with the X- and Y-axes being in the plane of substrate member 10 and the Z-axis being out of the plane. Substrate member 10 may be made of at least one of number of materials, such as silicon, InP and its alloys, GaAs and its alloys, GaN and its alloys, GaP and its alloys, quartz, sapphire, transparent conductive oxides including oxides of zinc, tin and indium, glass, ceramic, plastic, metal and any other dimensionally stable material that is suitable for use in optoelectronic and integrated optical device applications.

Substrate member 10 includes one or more grooves 30 formed in upper surface 12. Grooves 30 have a bottom 31 and sidewalls 32. In an example embodiment, grooves 30 run from front end 16 to back end 18, as shown. Grooves 30 are intended to serve as guides for optical fibers and so are formed to have a width and depth that accommodates (e.g., are slightly larger than) the diameter of an optical fiber. Grooves 30 may be formed by a variety of processes, including precision sawing, isotropic or anisotropic etching (e.g., reactive ion etching, chemical etching or photo-chemical etching) or molding processes. The cross-sectional profile of grooves 30 (or grooves 30' discussed below) may be rectangular-shaped, V-shaped, or U-shaped, or some other profile formed by a combination of these and/or other profiles. Besides extending along the entire length of substrate member 10 as shown, grooves 30 may also terminate at some location within the substrate member, as discussed below.

Figure 2:
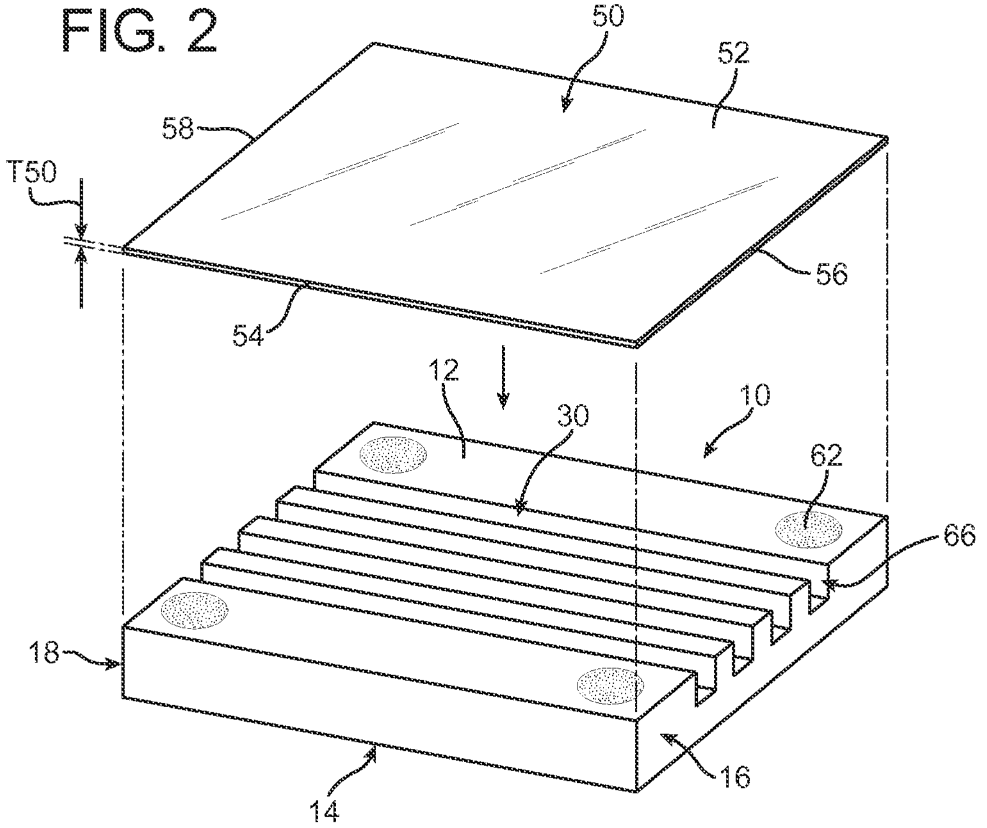
FIG. 2 is a perspective view similar to FIG. 1, but also showing a transparent sheet in the process of being disposed atop the grooved substrate member to form an example channeled substrate.
Figure 3:
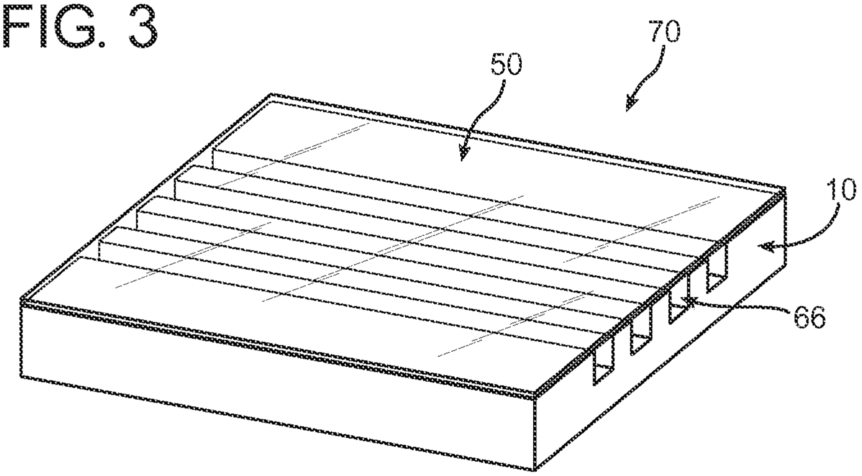
FIG. 3 is a perspective view of the channeled substrate formed in FIG. 2.

After substrate groove fabrication is completed, then with reference to FIG. 2 and FIG. 3, a thin transparent sheet 50 with an upper surface 52, a lower surface 54, front and back ends 56 and 58 and a thickness $T_{50}$ is disposed on grooved top surface 12 of substrate member 10. In an example embodiment, transparent sheet 50 is made of glass. Transparent sheet 50 is fixed to top surface 12 using one of a variety of techniques, such as fixing material 62, e.g., a bonding agent, an adhesive or an epoxy. For example, fixing material 62 may be applied to selected regions of transparent substrate lower surface 54 using screen printing processes, or to portions of substrate member upper surface 12 prior to placing transparent sheet 50 atop the substrate member upper surface. If substrate member 10 is made of silicon, then in an example embodiment anodic bonding is used to fix transparent sheet 50 to substrate member upper surface 12.

In the case where substrate member 10 has a coefficient of thermal expansion (CTE) closely matched to that of transparent sheet 50, and the substrate can sustain high temperatures (e.g., >850° C.), then in another example, the transparent sheet is fusion bonded to the substrate. Further in this example, the fusion bond is carried out under additional downward pressure applied to transparent sheet 50. In another example embodiment, transparent sheet 50 is laser fused to substrate member 10 at selected locations.

An exemplary material for transparent substrate 50 is glass because it is optically transparent over a wide range of wavelengths, can support conductive contacts as well as transparent conductive oxides, is compatible with packaging and assembly processes, and can be fabricated in thin sheets at low cost and with controlled thicknesses. Further, glass is a low-CTE material that can be compositionally engineered to match the CTE of silicon or III-V optoelectronic semiconductor materials used in integrated optical devices, such as GasAs, InP, GaN, GaP and their alloys. In addition, glass has a refractive index that can be made relatively high to limit the diffraction of beam propagation within the glass. This extends the allowable spacing between active optical components and the optical fiber array, as described below. The refractive index can also be made relatively low to reduce back reflections at glass optical interfaces. Alternative suitable materials for transparent sheet 50 include sapphire and quartz for their various optical, thermal, chemical, and mechanical properties.

An example range of thickness $T_{50}$ for transparent sheet 50 is between about 75 μm and about 125 μm for low-loss coupling of light of wavelength $\lambda$=1.55 μm into multimode optical fibers. In an example embodiment, transparent sheet 50 includes at least one anti-reflection coating (not shown) on one or both of upper and lower surfaces 52 and 54. The at least one anti-reflection coating may be applied either before or after transparent sheet 50 is joined to substrate member upper surface 12.

Transparent sheet 50 and substrate member upper surface 12 form an assembly where grooves 30 and the transparent sheet define channels 66, and may be treated as a single unitary channeled substrate through subsequent processing. The combination of transparent sheet 50 and grooved substrate 10 is therefore referred to hereinbelow as "channeled substrate" 70. Grooved substrate member 10 serves as a robust mechanical support for transparent sheet 50, which in some cases is too flexible and/or fragile to withstand subsequent processing steps on its own.

Figure 4:
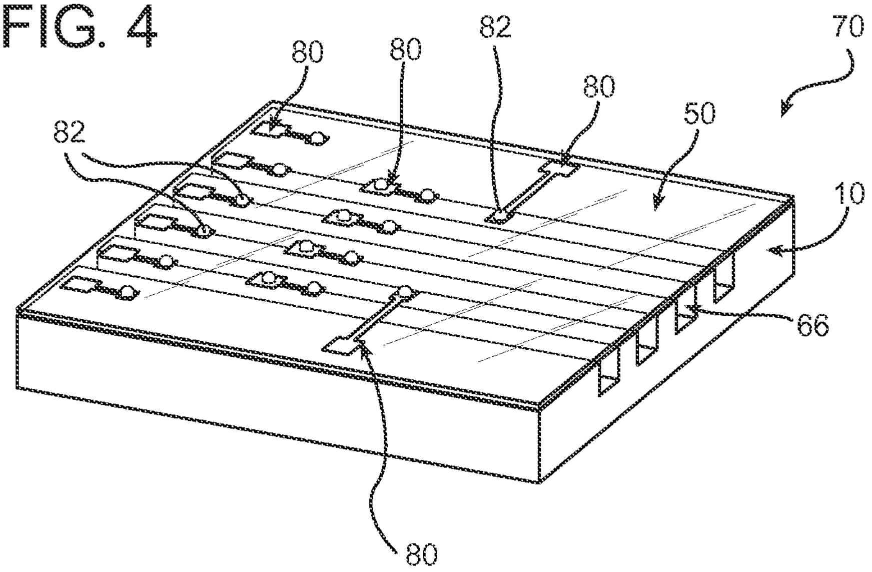
FIG. 4 is the same as FIG. 3, but with conductive contacts formed on the upper surface of the transparent sheet.

With reference to FIG. 4, conductive contacts 80 are added to upper surface 52 of transparent sheet 50. Conductive contacts 80 are applied, for example, using screen printing, electrochemical plating, photochemical etch processing or other known processes. During the contact formation process, conductive contacts 80 are aligned to substrate grooves 30 so that the subsequently mounted active optical components are aligned with the centers of grooves 30.

Conductive contacts 80 provide electrical contact to the active components. One exemplary type of conductive contacts 80 have a patterned configuration while another exemplary conductive contact is or includes contact pads. The conductive contacts 80 of FIG. 4 are shown as having two wider pad sections connected by a relatively narrow wire section. In one example embodiment, conductive pads 80 are made of a metal such as gold, chrome, tin, titanium, silver, and indium either alone or in combination. In another example embodiment useful for when it is desired to propagate optical beams through conductive contacts 80, the conductive contacts are formed from a transparent conductive material, such as oxides of zinc, oxides of indium and oxides of tin. In some embodiments, substrate member 10 is made of a thick film or sheet of transparent conductive material, in which case both the substrate member and conductive contacts 80 are combined as one. This configuration is useful, for example, when it is desired to terminate all the common leads of active components to the same electrical ground plane.

Figure 5:
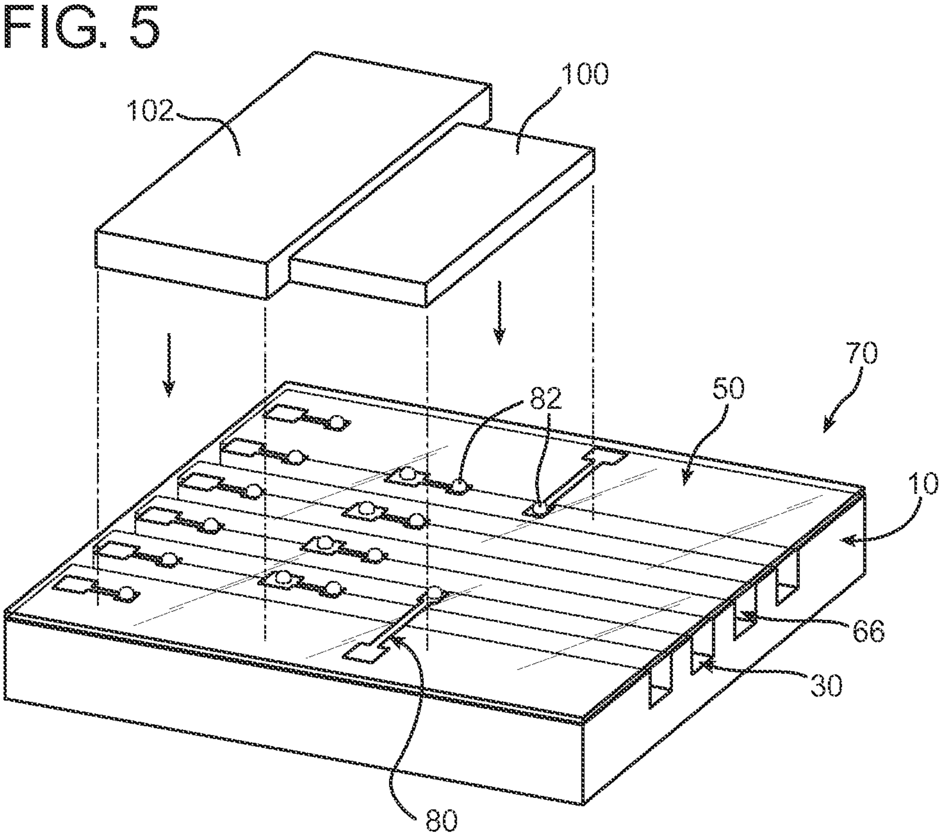
FIG. 5 is the same as FIG. 4, but with solder balls formed on conductive contacts, and with an active optical component and an active electrical component in the process of being disposed atop the conductive contacts and solder balls.
Figure 6:
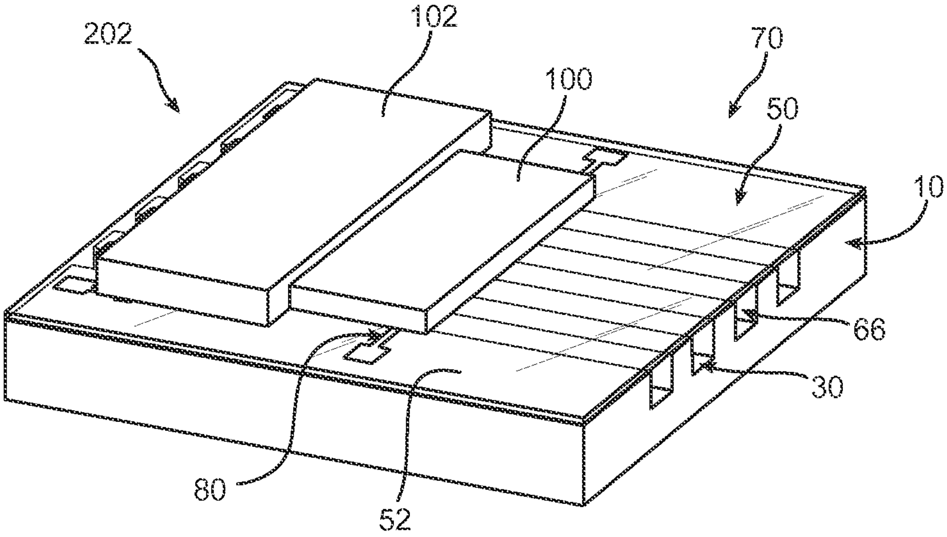
FIG. 6 is similar to FIG. 5, but with active optical and electrical components flip-chip mounted on the channeled substrate.

With reference now to FIG. 5 and to FIG. 6, solder balls 82 are applied to select conductive contacts 80. Active optical components 100 (e.g., light sources such as VCSELs, photodetectors such as broad-area array detectors, optical modulators such as free carrier optical modulators, etc.) and active electronic components 102 (e.g., driver chips, receiver chips, etc.) are then flip-chip mounted onto solder balls 82. While FIG. 5 and FIG. 6 show one active optical component 100 mounted over the array of channels 66, in general one or more active optical components may be arranged on the same channeled substrate 70. In one example embodiment, a transmitter active optical component 100 in the form of a VCSEL array is positioned over one set of channels 66, while a receiver active optical component in the form of a detector array is positioned over a different set of channels.

In the case where active component 100 is in the form of an optical modulator, and in particular is of the kind that are themselves optically transmissive rather than optically reflective in nature, it is preferable to provide for a substantially transparent path for the light to continue through the active optical component where further use can be made of that portion of the optical beam. Further in an example embodiment, an active electronic component 102 in the form of an electronic driver or receiver chip is also operably arranged on channeled substrate 70. FIG. 6 shows channeled substrate 70 after flip-chip attachment of an active optical component 100 and an active electronic component 102. The configuration of FIG. 6 is also referred to as an "integrated optical device" 202.

Note that active optical components 100 include devices such as edge emitting lasers, planar waveguides and fiber arrays that emit or receive light in a direction parallel to the plane of channeled substrate 70. For such active optical components 100, an optical right-angle-bend structure or element (not shown) is provided in or adjacent these devices. For example, the edge of a planar lightwave circuit (PLC) may be beveled at an angle at or near 45° to direct light nominally perpendicular to the PLC substrate. Alternatively, a separate right-angle mirror structure may be either be added adjacent the active optical component or formed in some portion of the transparent layer via sawing or other surface profiling method.

Active optical components 100 may also be oriented perpendicular to channeled substrate 70 (specifically, perpendicular to upper surface 52 of transparent sheet 50) so that light follows a perpendicular emission path through the transparent sheet in a manner similar to a VCSEL light source.

Figure 7:
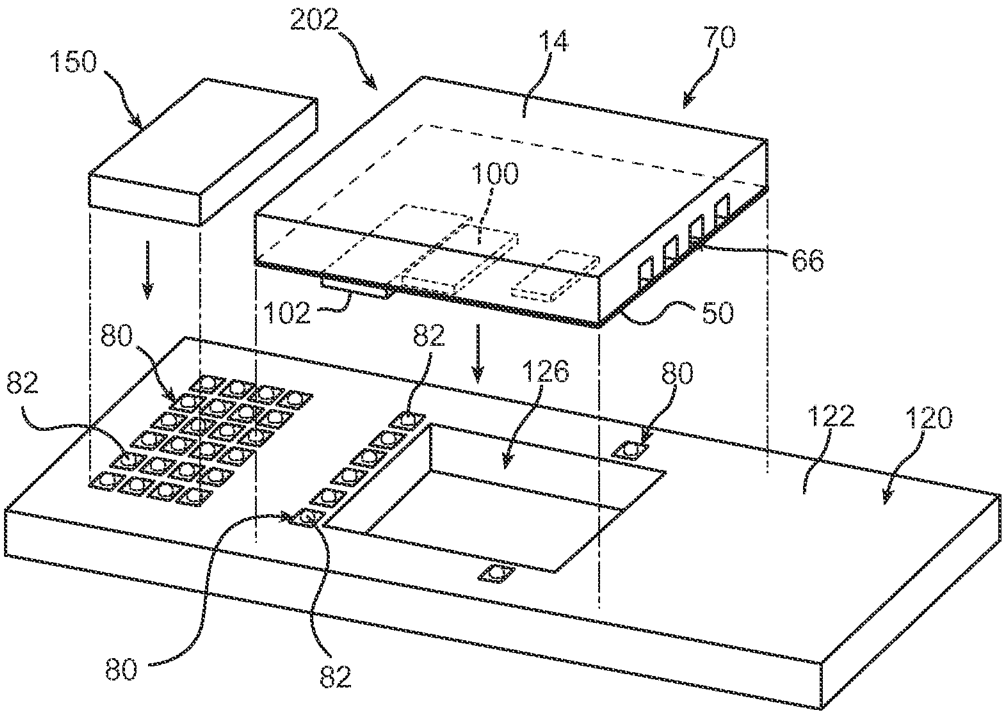
FIG. 7 shows the channeled substrate of FIG. 6 flipped over and being attached to a larger substrate in the form of a printed circuit board ("PCB substrate"), and also showing a support chip operably mounted on the PCB substrate.
Figure 8:
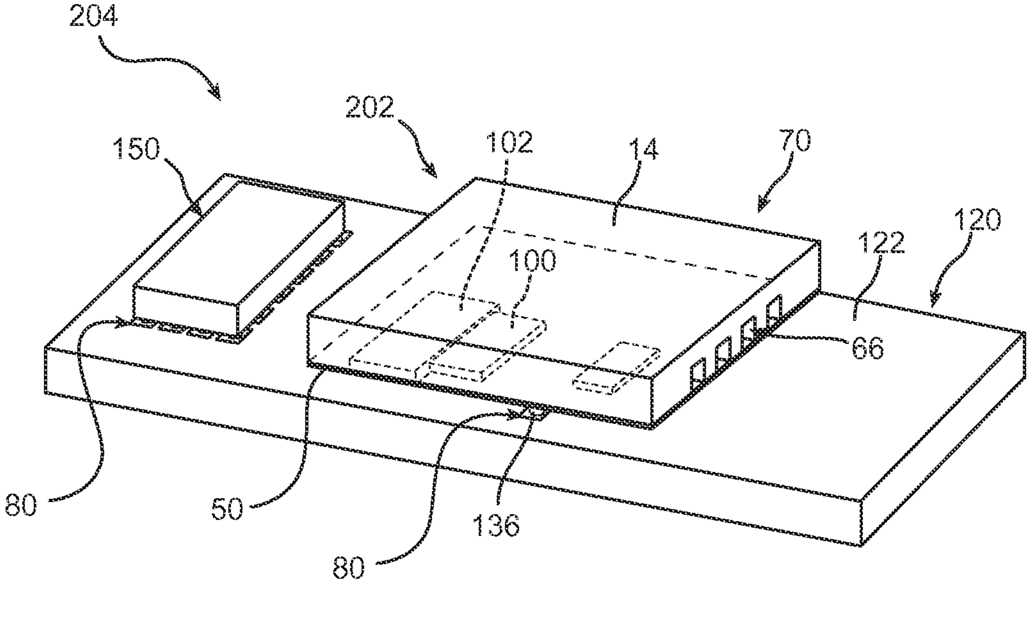
FIG. 8 is similar to FIG. 7, but shows the channeled substrate and support chip in place on the PCB substrate.

With reference now to FIG. 7, in the next processing step, integrated optical device 202 of FIG. 6 is flipped over and attached to a larger substrate 120, such as a printed circuit board (PCB) (hereinafter, "PCB substrate" 120). PCB substrate 120 has an upper surface 122, which optionally has a hole or recess 126 formed therein that prevents mechanical interference with the flip-chip mounted active optical and electrical components 100 and 102 on channeled substrate 70 when channeled substrate is mounted in or on the PCB substrate. PCB substrate upper surface 122 includes conductive contacts 80 and solder balls 82 around the perimeter hole or recess 126 that provide the various electrical connections required between the PCB substrate and integrated optical device 202. In an example embodiment, the attachment process may also involve flip-chip mounting of auxiliary or support chips 150 on PCB substrate 120. The result is a PCB assembly 204 as shown in FIG. 8.

Figure 9:
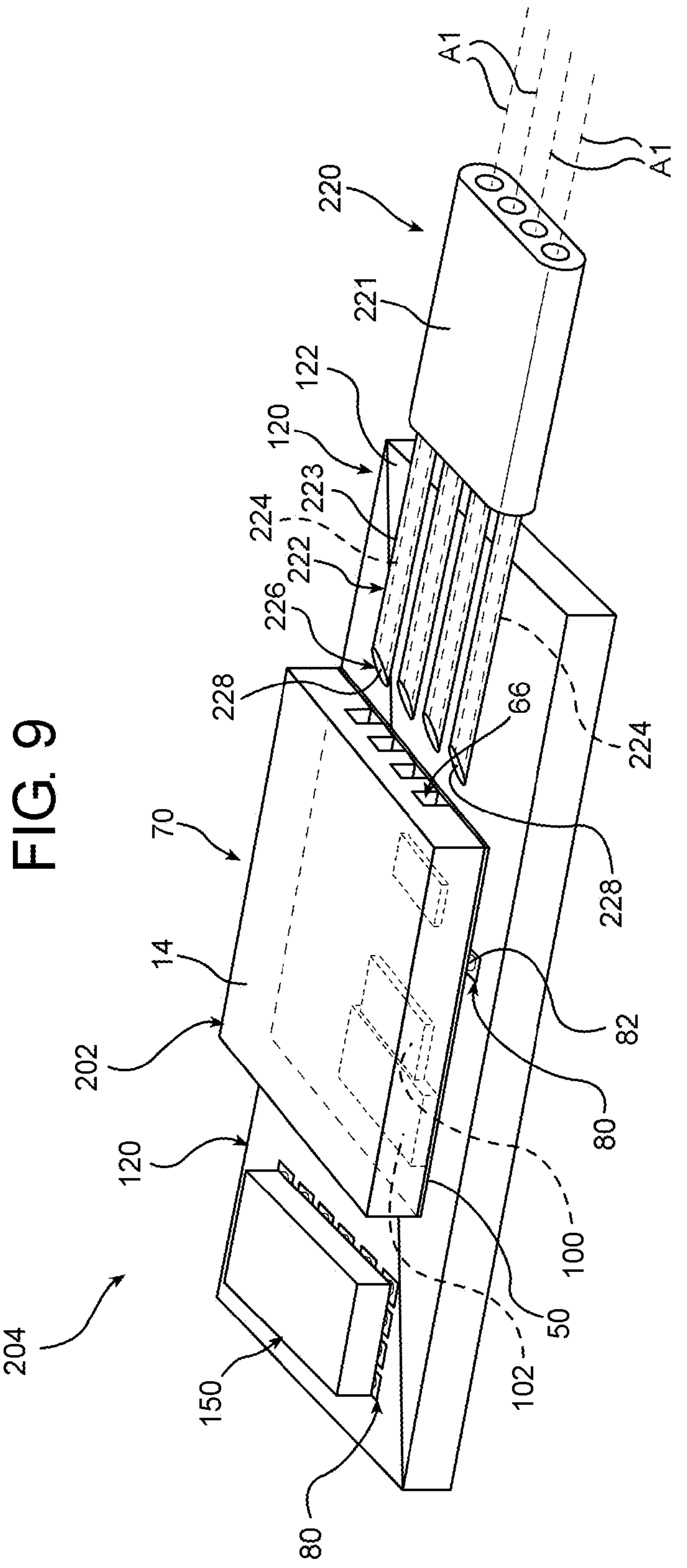
FIG. 9 is the same as FIG. 8, but shows an array of optical fibers being inserted in the channels of the channeled substrate.

With reference now to FIG. 9, an optical fiber array 220 having a jacketed portion 221 and constituted by optical fibers 222 each having an outer surface 223, a core 224, and a cleaved (e.g., laser-cleaved) fiber end 226, is provided and is inserted into channels 66 in channeled substrate 70. In an example embodiment, optical fiber array 220 constitutes an optical fiber cable such a ribbon fiber cable. In an example embodiment, fiber ends 226 are angled and thus have an angled end face 228, wherein the end-face angle may be formed at or near 45°, or at other angles relative to optical fiber axis A1 that provide improved optical performance (e.g., reduced back reflection, increased bandwidth in multimode fibers, etc.). The pointed shapes of angled fiber ends 226 facilitate insertion of fibers 222 into channels 66. In an example embodiment, the exposed (open) ends of channels 66 are flared to further facilitate the insertion and alignment of fiber array 220 within channels 66.

Figure 10:
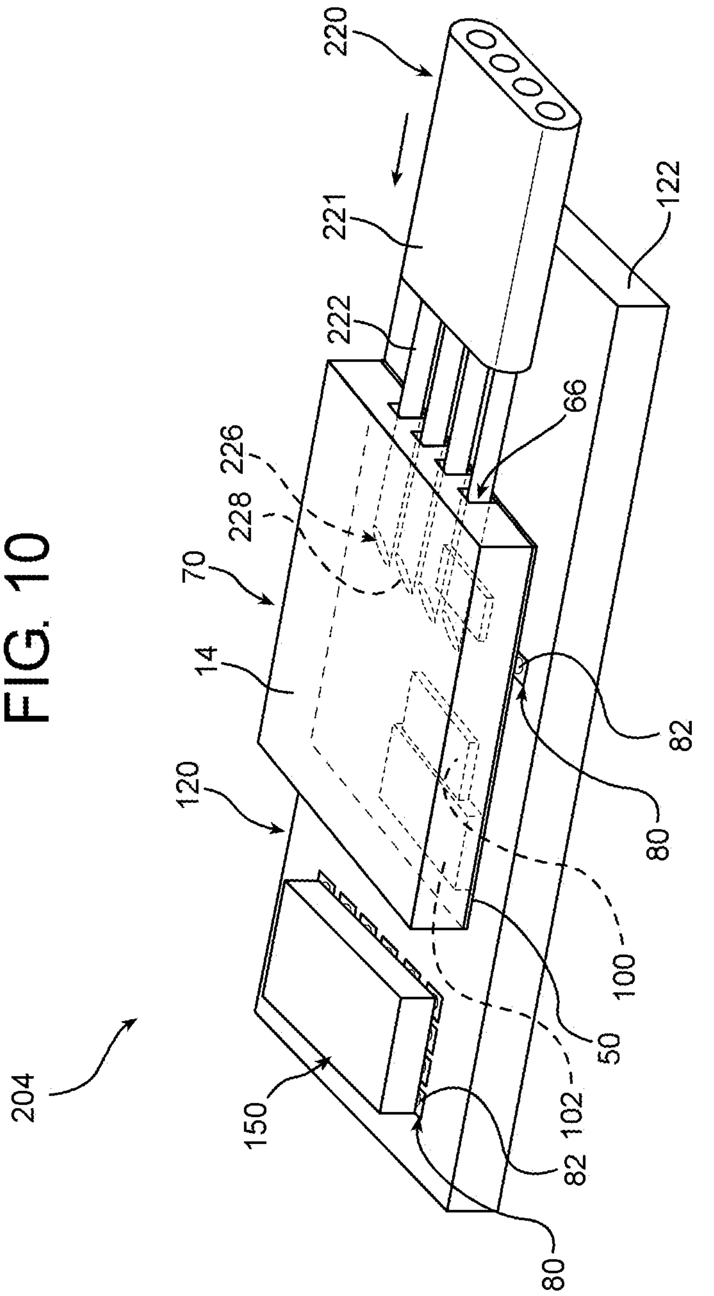
FIG. 10 is the same as FIG. 9, but with the fiber array in place within the channeled substrate.

FIG. 10 shows PCB assembly 204 after fiber array 220 is incorporated therein by being inserted into channels 66. Fiber array 220 is inserted into channels 66 until angled fiber ends 226 are aligned to active optical components 100. For a transmitter active optical component 100 in the form of a VCSEL or other light source, in an exemplary method active optical feedback is employed to align fiber array 220. This alignment method involves activating active optical component 100 and adjusting the position of optical fiber array 220 within channels 66 until power is maximized at the remote end of the optical fiber array. For a receiver active optical component 100, light is launched into the remote end of optical fiber array 220, and the receiver power is actively monitored as the position of the fiber array is adjusted within channels 66. In another example embodiment, a vision system (not shown) configured to recognize components or fiducials as viewed through channeled substrate 70 allows for aligning optical fiber array 220 with active optical component 100 without the added difficulty of having to power up the active optical component.

Back reflections and etalon effects may occur at the interface between optical fiber outer surface 223 and sidewalls 32 and/or transparent sheet lower surface 54 that defines channels 66. In an example embodiment, such effects are reduced using anti-reflection coatings on at least one of optical fiber outer surface 223, channel walls 32 and transparent sheet lower surface 54. Alternatively, an index-matched epoxy or index-matched fluid (not shown) is applied at this interface. The index-matched epoxy also serves to compensate for minor variations in the fiber outside diameter in the interface region. Back reflections may also be reduced by appropriate selection of the index of refraction of transparent sheet 50 at the given wavelength of operation.

Figure 11:
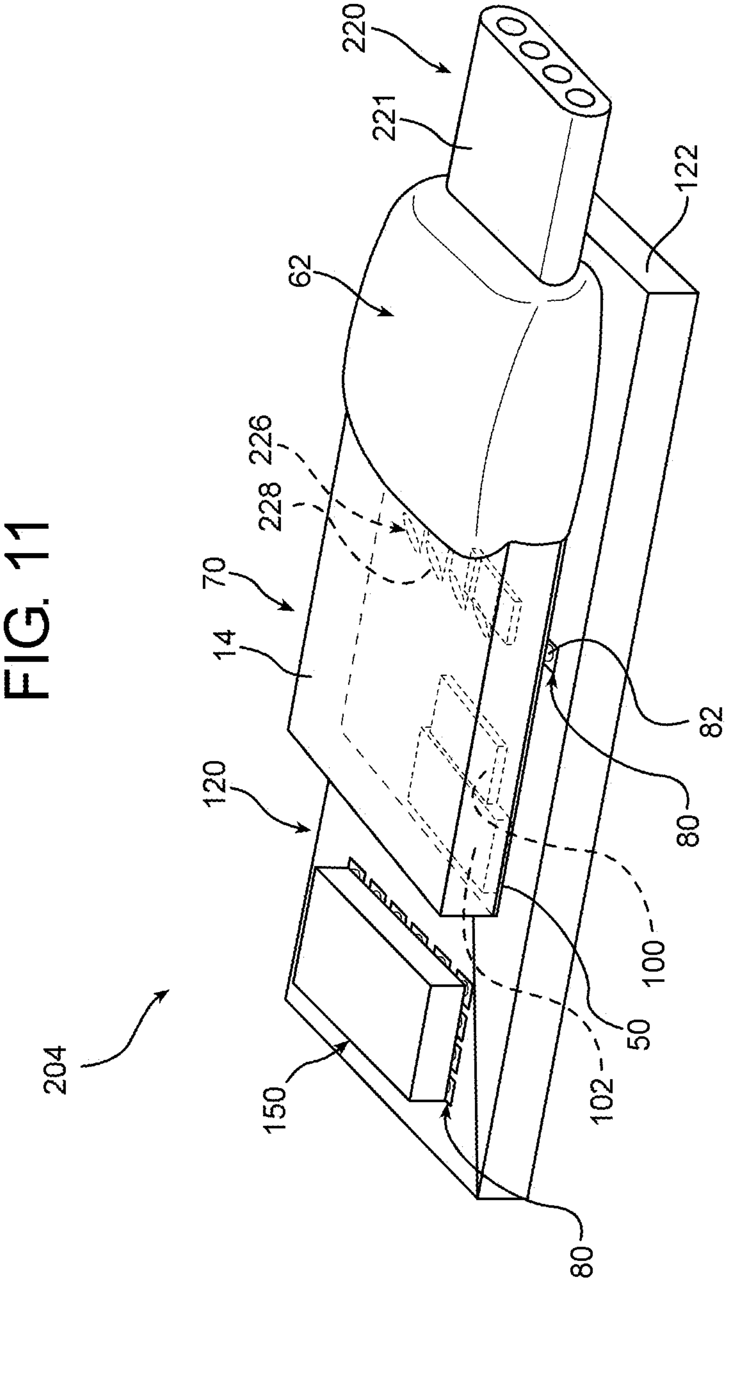
FIG. 11 is the same as FIG. 10, but shows the fiber array being held to the channeled substrate and the PCB substrate with a glob of fixing material.

As a final assembly step, it may be necessary to mechanically restrain fiber array 220 so that optical fibers 222 do not move within channels 66. FIG. 11 is a schematic diagram similar to FIG. 10 but that illustrates an example embodiment where fixing material 62 is applied (e.g., as a glob of bonding material) over fiber array 220 at substrate end 18. Other example solutions include crimping the fiber array protective jacket 221 to PCB substrate 120 so that optical fibers 222 are immobilized relative to PCB assembly 204.

Figure 12:
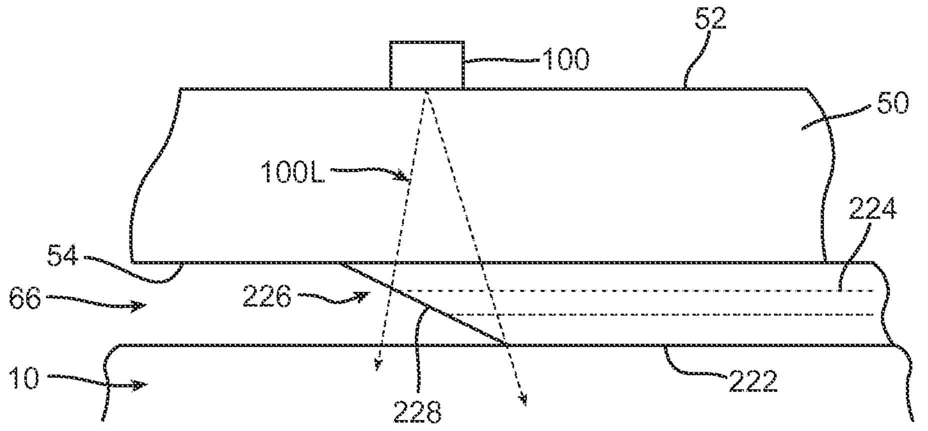
FIG. 12 is a close-up view of an active optical component and an optical fiber residing on opposite sides of the transparent sheet and showing the divergence of the light beam from the active optical component as the light beam travels through the transparent sheet.

For low-loss coupling of light from a transmitter active optical component 100 mounted on transparent sheet upper surface 52 and an optical fiber 222 mounted near transparent sheet lower surface 54, it is best that thickness $T_{50}$ of transparent sheet 50 not be too thick. For example, with reference to FIG. 12, a light beam 100L launched from transmitter active optical component 100 passes through transparent sheet 50. Because of diffraction effects, light beam 100 increases in diameter as it propagates. If transparent sheet 50 is too thick, the diameter of light-beam 100L will be substantially larger than the diameter of optical fiber core 224, resulting in low-efficiency coupling of the light into optical fiber 222. Assessment of beam divergence in a transparent sheet 50 made of glass with an index of refraction of n=1.45 using a VCSEL light source with about an 8 μm aperture and coupling into a multimode optical fiber 222 having a core 224 with a diameter of 30 μm indicates that transparent sheet 50 should have a thickness $T_{50}$ no greater than about 250 μm for λ=850 nm, and no greater than about 130 μm for λ=1.55 μm.

In addition, measurements of link bandwidth for short multimode optical fiber links of less than 300 m as a function of distance between a VCSEL transmitter active optical component 100 and fiber end 226 show that optimal performance is best when the separation distance in air is between about 80 um to about 100 μm. This separation distance corresponds to a glass thickness $T_{50}$ of about 150 μm for λ=1.55 μm. Low-cost glass fabrication techniques that use a fusion draw process allow for forming glass transparent sheets 50 of precise thickness (e.g., ±1 μm) down to thickness $T_{50}$ of at least 100 μm. Thin glass transparent sheets 50 having a thickness $T_{50}$ of at least 100 μm are sufficiently stiff and relatively easy to handle. Thus, an example range for thickness $T_{50}$ for a glass transparent sheet 50 is between about 200 μm and about 250 μm when using active optical components 100 in the form of VCSELs operating λ=850 nm, and is between about 100 μm and about 150 μm for VCSELs operating λ=1.55 μm.

Wafer-Scale Fabrication of Channeled Substrate Assemblies

The process for fabricating channeled substrate 70 is scalable up to larger (e.g., "wafer scale") substrate members 10 and transparent sheets 50, thereby allowing many individual channeled substrate 70 and integrated optical devices 202 to be fabricated on the same substrate member and then later separated (diced) from each other. The use of larger substrate members 10 reduces fabrication costs because the various processing steps (e.g., sawing, conductive contact formation, chip attachment and dicing of individual substrates) can be carried out in parallel on a single structure. The shape and thickness of channeled substrate 70 can be selected to mimic existing standard size wafers and transparent sheets. This allows the larger substrate members 10 to utilize existing processing equipment without modification, even though the substrate properties (e.g., glass with channel structures) may be very different from the substrates normally handled by the processing equipment.

Figure 13:
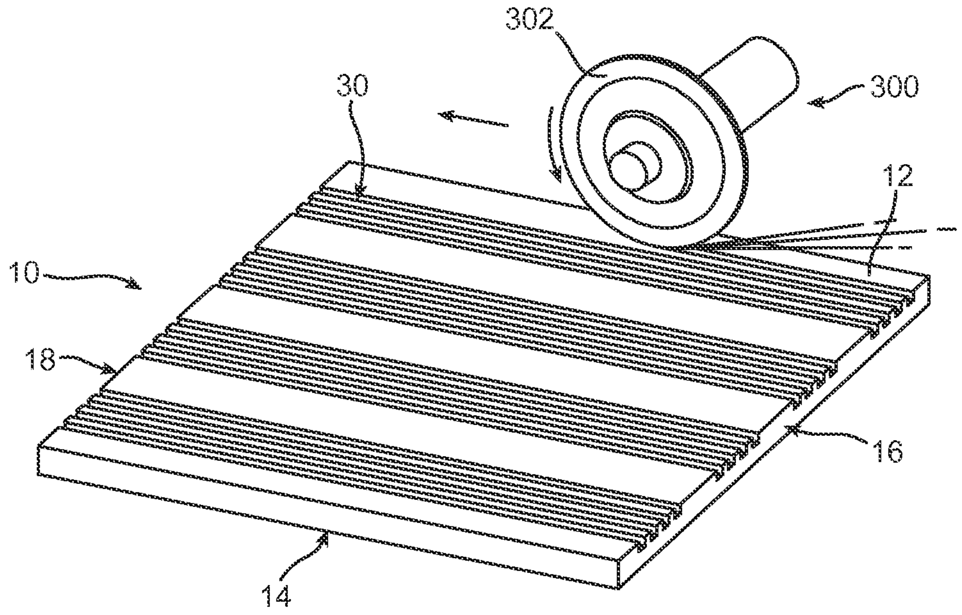
FIG. 13 is a perspective view of a wafer-scale substrate member showing grooves being cut therein with a saw.

FIG. 13 through FIG. 18 show various example processing steps for forming channeled substrate assemblies 70 as well as integrated optical devices 202 and PCB assemblies 204 when scaled up to larger size substrate members 10. FIG. 13 is a perspective view of an example method of forming grooves 30 in substrate member 10 using a saw 300 having a saw blade 302. Precision sawing operations form grooves 30 with well-controlled geometries. For example, precision V-groove sawing operations in ceramic and glass materials can produce grooves 30 where the pitch and depth are controlled to within about 1 μm. Other less-precise sawing operations may still provide more relaxed but acceptable geometrical control of groove structures (e.g., to within a tolerance of about 3 μm to 5 μm) at more economical cost. Such tolerances are generally acceptable for alignment of active optical components 100 to multimode optical fibers 220.

Figure 14:
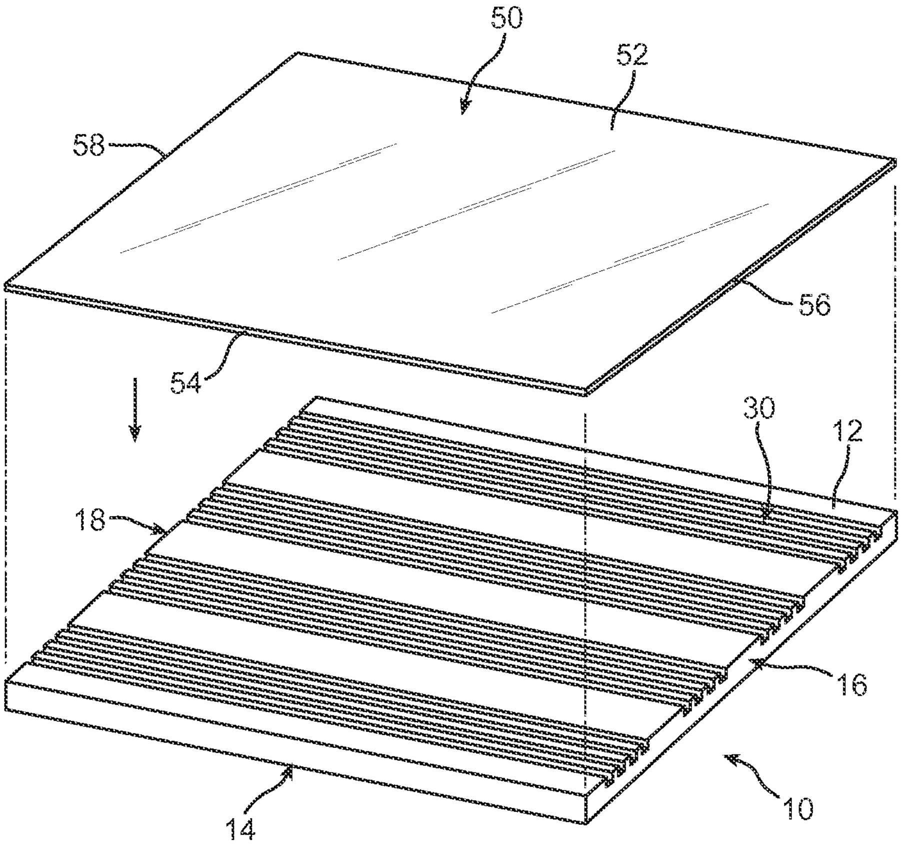
FIG. 14 is a perspective view showing a wafer-scale transparent sheet being disposed atop the grooved substrate member of FIG. 13.
Figure 15:
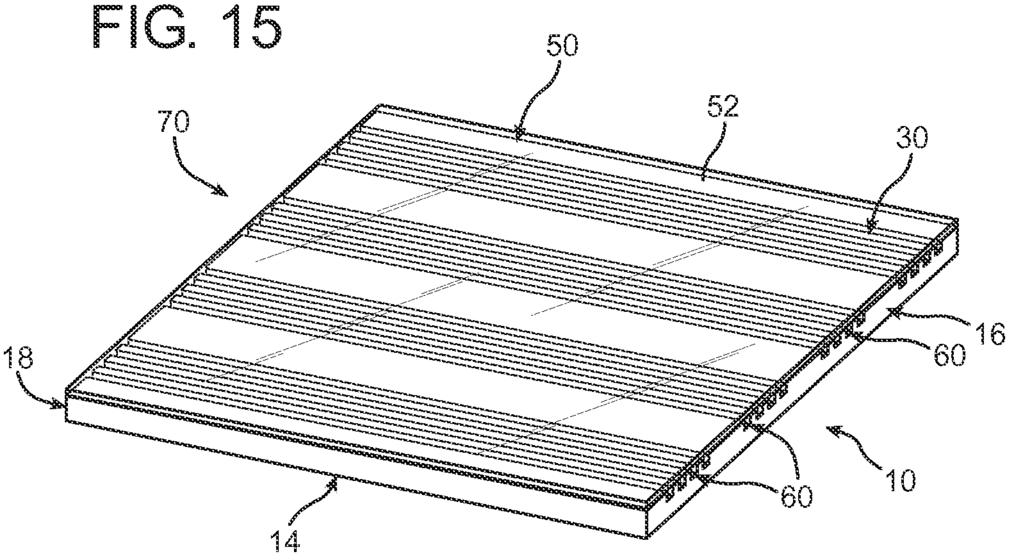
FIG. 15 is a perspective view similar to FIG. 14, showing the transparent sheet of FIG. 14 in place atop the grooved substrate member of FIG. 13, thereby forming a wafer-scale channeled substrate.

FIG. 14 is a perspective view of transparent sheet 50 being disposed on grooved substrate member upper surface 12, and FIG. 15 is a similar view showing the transparent sheet in place to form channeled substrate 70. At this stage, in an example embodiment the overall size and shape of channeled substrate 70 is trimmed to match a desired shape.

Figure 16:
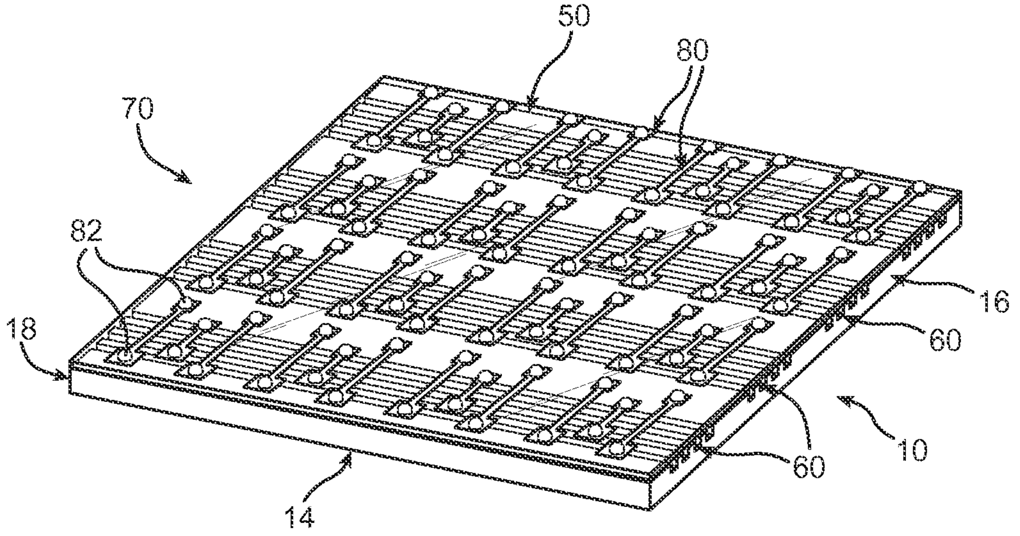
FIG. 16 is a perspective view similar to FIG. 15, but shows the conductive contacts formed on the upper surface of the transparent sheet.
Figure 17:
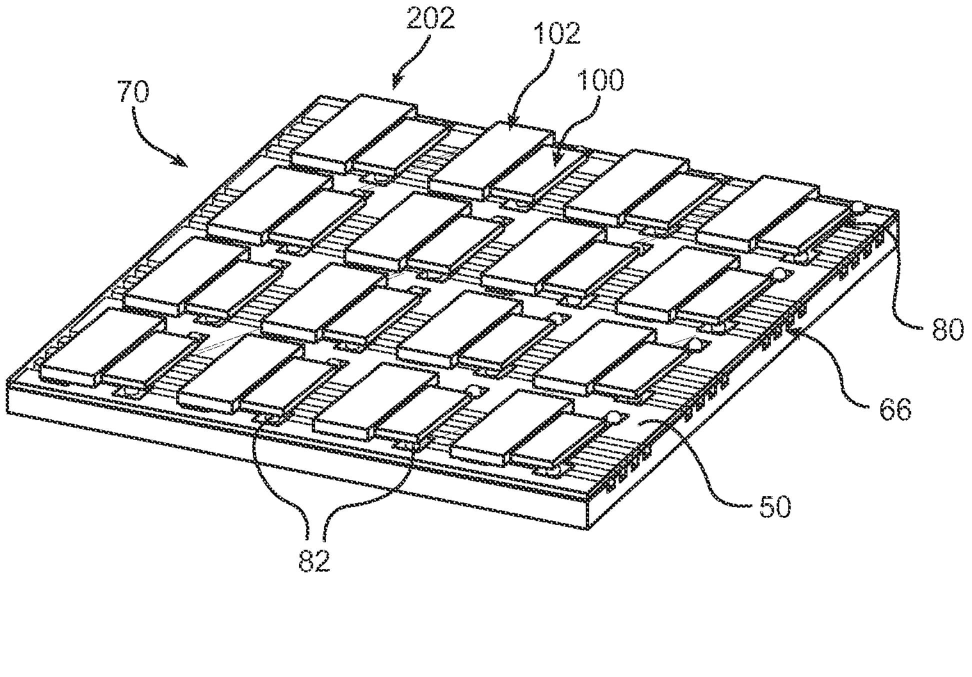
FIG. 17 is similar to FIG. 16, but shows active optical components and active electrical components flip-chip mounted to the channeled substrate in forming integrated optical devices.

FIG. 16 is a perspective view of the channeled substrate 70 of FIG. 15, but with conductive contacts 80 applied at multiple locations. The process (e.g., pad metallization) for forming conductive contacts 80 is carried out, for example, using a single masking and patterning operation for the entire channeled substrate 70, or by using multiple operations on different portions of the channeled substrate. Pad metallization or patterned transparent conductive oxide (or PTCO) may be applied before or after grooves 30 are formed. In either case, a precision alignment is made between the mask and the underlying channels 66 to ensure that when optical fibers 222 are placed in the channels they are correctly aligned with active optical devices 100 that are flip-chip mounted on conductive contacts 80. The transparency of transparent sheet 50 facilitates this alignment process. Transparent sheet 50 also makes it easier to ensure that the surface and buried features of PCB assembly 204 align to micrometer-scale tolerances.

After conductive contacts 80 are formed, solder balls 82 are placed on the conductive contacts. Then, with reference to FIG. 17, active optical components 100 and the related active electrical components 102 are flip-chip mounted on channeled substrate 70 on the different pad metallization (or PTCO) locations. This approach leads to significant cost reduction since solder ball application, flip-chip mounting and solder reflow processes are carried out at wafer scale.

Figure 18:
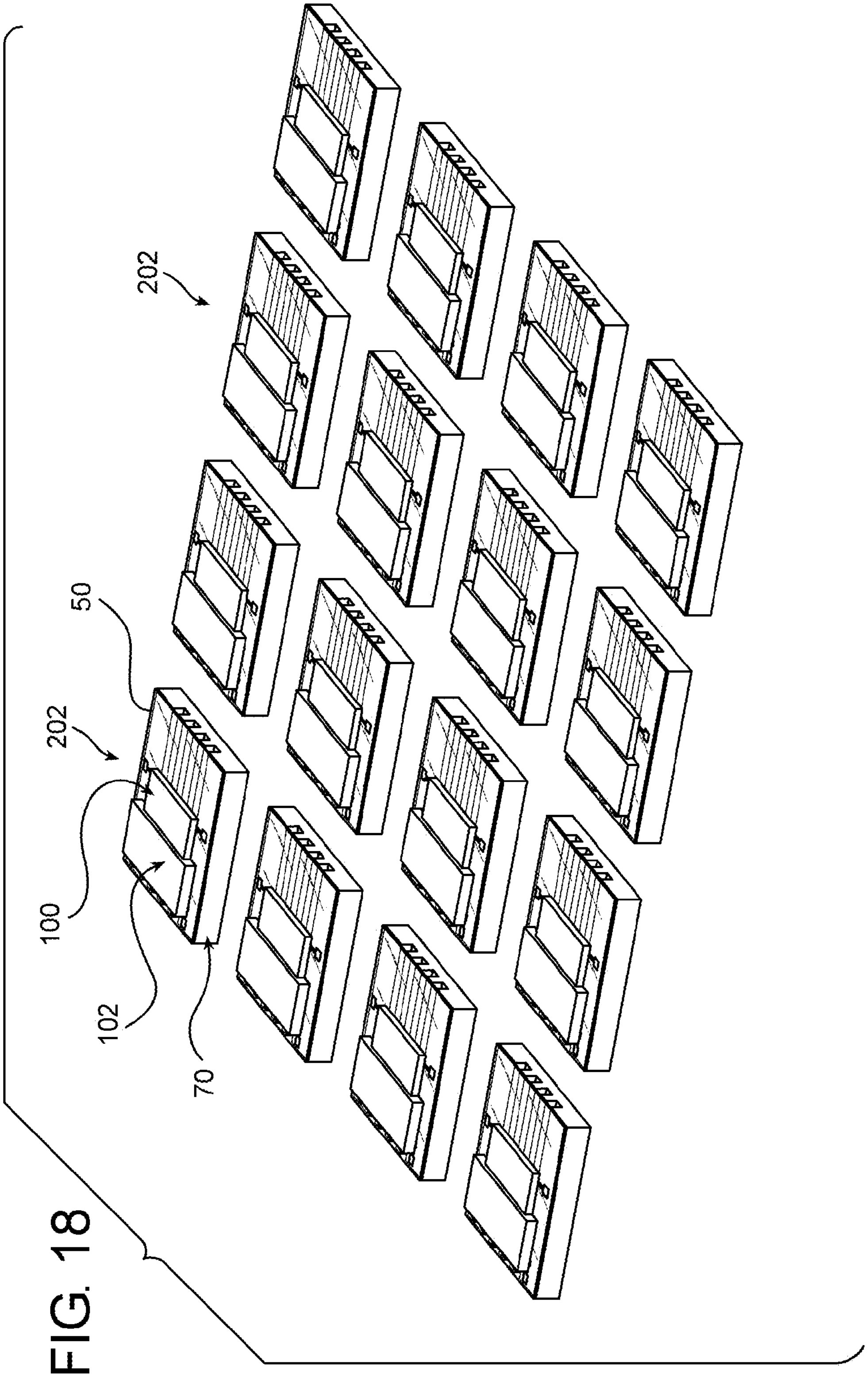
FIG. 18 is similar to FIG. 17, but after dicing the wafer-scale channeled substrate to separate the individual integrated optical devices.

After the flip-chip mounting step, with reference to FIG. 18 a dicing operation is carried out to separate out the individual integrated optical fiber devices 202. Integrated optical fiber devices 202 are then optionally mounted into a larger optical sub-assembly (not shown) such as a PCB substrate. Fiber arrays 220 are then inserted into channels 66 of respective channeled substrates 70 to complete the integrated optical devices 202 or PCB assemblies 204 as discussed above (see, e.g., FIG. 7).

Molded Channel Substrates

Precision grooves 30 may also be formed in various substrate materials using molding operations. In one example embodiment, V-grooves 30 with features that have micrometer-scale positional accuracy are formed in a molded plastic substrate member 10. In another example embodiment, hot pressing of glass sheets into molds is used to created grooves 30 that vary in size and position with a tolerance of between about 3 μm to about 5 μm. These techniques may be used to create grooved substrate members 10.

Figure 19:
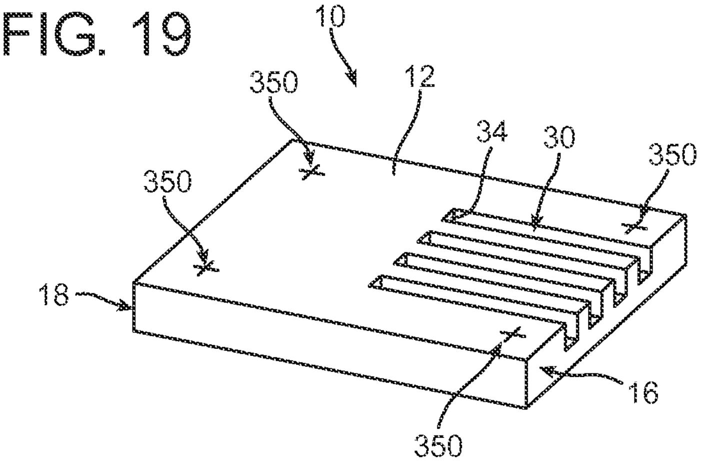
FIG. 19 is a perspective view of a molded substrate member with grooves formed therein, wherein the grooves terminate within the substrate member rather than extending from end to end.

FIG. 19 is a perspective view of a substrate member 10 similar to that of FIG. 1, but showing grooves 30 formed via a molding operation. Unlike sawed grooves 30, molded grooves can be readily made to have an end wall 34 within the substrate member rather than extending from front to back ends 16 and 18. In an example embodiment, end walls 34 are established by a molded stop that terminates grooves 30 at 90°. End walls 34 thus serve as channel end walls and act as a fiber stop when optical fibers are inserted into channels 66. In another example embodiment, the molding operation creates molded fiducials 350 at various locations on substrate member upper surface 12, wherein the fiducials are precision aligned with respect to molded grooves 30. Fiducials 350 are used, for example, to aid in aligning transparent sheet 50 and the subsequent conductive contacts 80 to grooves 30.

Figure 20:
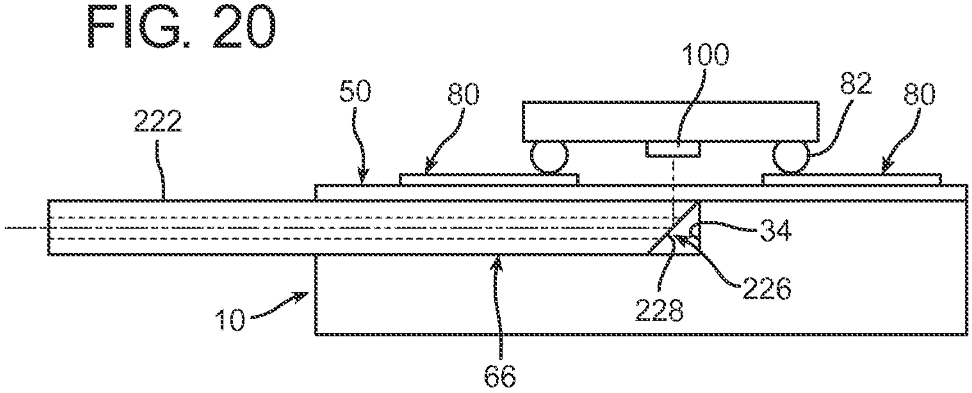
FIG. 20 is a cross-sectional view of an example integrated optical device that employs a channeled substrate that uses the molded substrate member of FIG. 19.

FIG. 20 is a cross-section view of an integrated optical device 202 that employs a channeled substrate 70 having a molded substrate member 10. Optical fiber 222 has an angled fiber end 226 that guides light in or out of the optical fiber in a direction roughly perpendicular to the fiber axis A1, i.e., upward to active optical component 100. During the formation of integrated optical device 202, fiber array 220 is inserted into channels 66 as described above. However, tapered fiber ends 226 contact the 90° end wall 34 and stop at a position where the angled fiber end is aligned with active optical component 100. The 90° end wall 34 does not come into contact with the angled fiber end face 228, ensuring that light guided by optical fiber 222 and that is incident upon the angled fiber end face 228 undergoes total internal reflection (TIR) and is reflected upward toward active optical component 100. Optimum alignment corresponds to optimum optical coupling between optical component 100 and optical fiber(s) 222.

Figure 21:
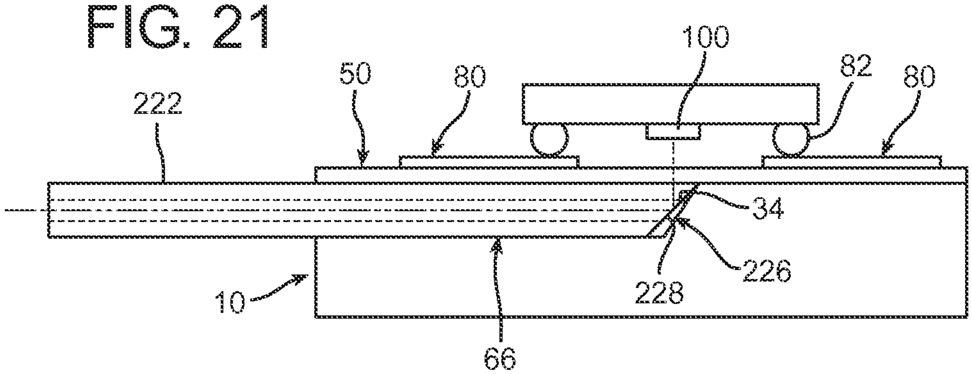
FIG. 21 is similar to FIG. 20, but shows an angled channel end having an angle less than that of the angled fiber end.
Figure 22:
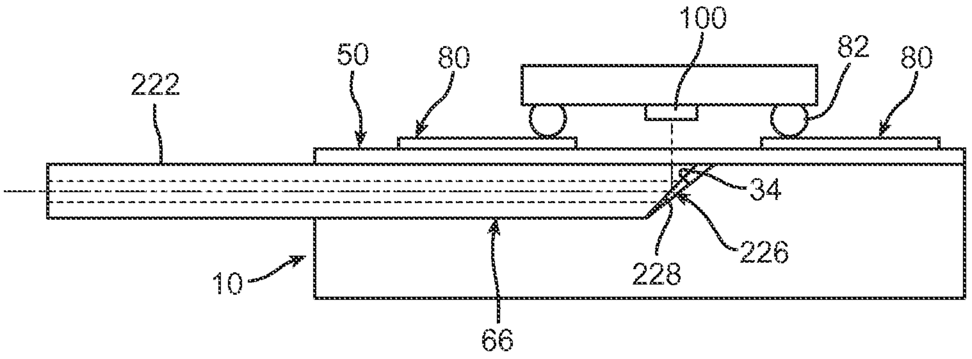
FIG. 22 is similar to FIG. 21, but shows an angled channel end having an angle greater than that of the angled fiber end.

The angle of channel end walls 34 can be adjusted to support angles less than 90°, such as shown in FIG. 21. In this regard, two general configurations are considered for the angled molded wall end 34. In the first configuration, the angle of end wall 34 is slightly larger than the angled face 228 at fiber end 226, such as shown in FIG. 21. When optical fiber 222 is fully inserted into channel 66, the tip at fiber end 226 contacts end wall 34 at its upper portion. In the second configuration shown in FIG. 22, the angle of end wall 34 is slightly smaller than the angled face 228 at fiber end 226. When optical fiber 222 is fully inserted into channel 66, the tip at fiber end 226 contacts end wall 34 at its lower portion.

In both cases, angled channel end wall 34 serves to align optical fiber end 226 directly below active optical component 100, without directly contacting angled face 228 at optical fiber end 226. Angled end wall 34 also serves to force optical fiber end 236 upward into firm contact with lower surface 54 of transparent sheet 50. This ensures that a controlled distance is maintained between active optical component 100 and optical fiber 222. The upward wedging function of angled channel end wall 34 also allows the depth of groove 30 to be slightly larger than the diameter of optical fiber 222 residing therein, which simplifies the process of incorporating optical fiber array 220 into channeled substrate 70. In another embodiment, end wall 34 is angled such that it is approximately parallel to fiber end face 228. In this case, end wall 34 provides a slight recess at a location that corresponds to fiber core 224. This recess allows total internal reflection of light within fiber 222 by providing a small air gap at one location on fiber end face 228. In an example embodiment, other portions of end wall 34 are configured to contact the fiber end 228 and force the fiber upward into contact with transparent sheet 50.

Channeled Substrates Formed by Drawing

Figure 23:
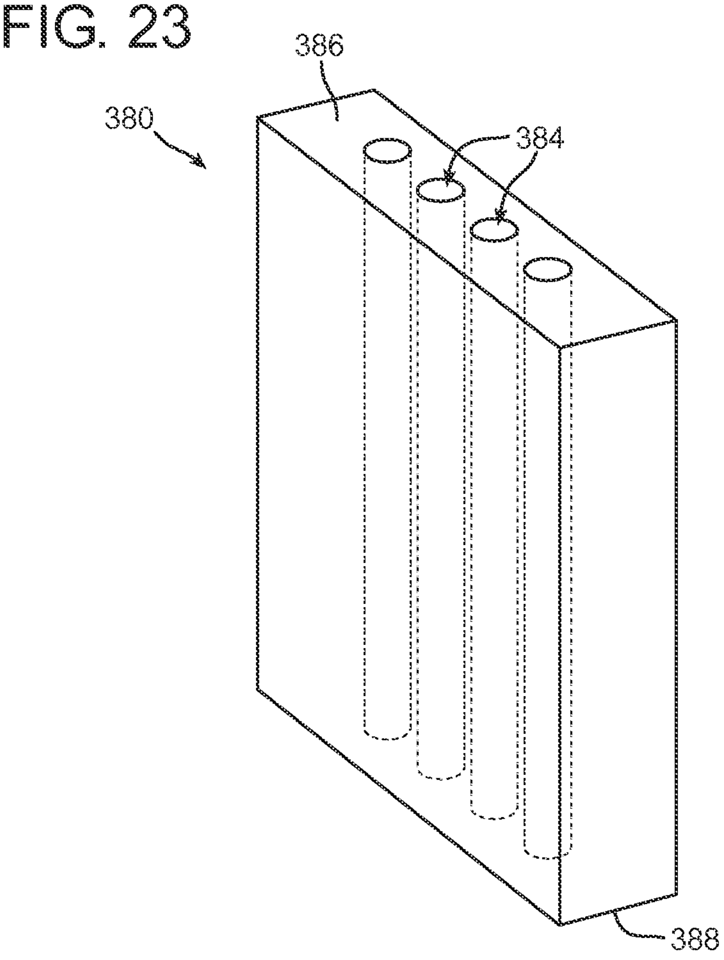
FIG. 23 is an example glass preform that is drawn to form channeled substrates similar to that shown in FIG. 3, but that have a unitary construction.

In an example embodiment, channeled substrate 70 is formed by drawing a suitably configured preform. FIG. 23 is a perspective view of a glass preform 380 having a cylindrical, rectangular-cross-sectioned body 382 within which is formed a number of channels 384. Preform 380 has opposite ends 386 and 388. Preform 380 is formed, for example, by machining a block of glass to select dimensions, and drilling holes in the glass block at precise locations at one of ends 386 and 388. Preform 380 is essentially a scaled-up version of channeled substrate 70.

The typical glass preform is fabricated in a geometry that is closely matches the shape of the final product but is many times (e.g., ten to one-thousand times) larger. A preform is generally suspended from one end and heated until the glass softens. Gravity and/or controlled tension applied to the free end of the preform causes the glass to be stretched into a narrow strand or body. The cross-section of this body generally preserves the geometry of the original preform, but with a much smaller size. Using this approach, feature sizes of the drawn article can be controlled down to sub-micrometer resolution.

Figure 24:
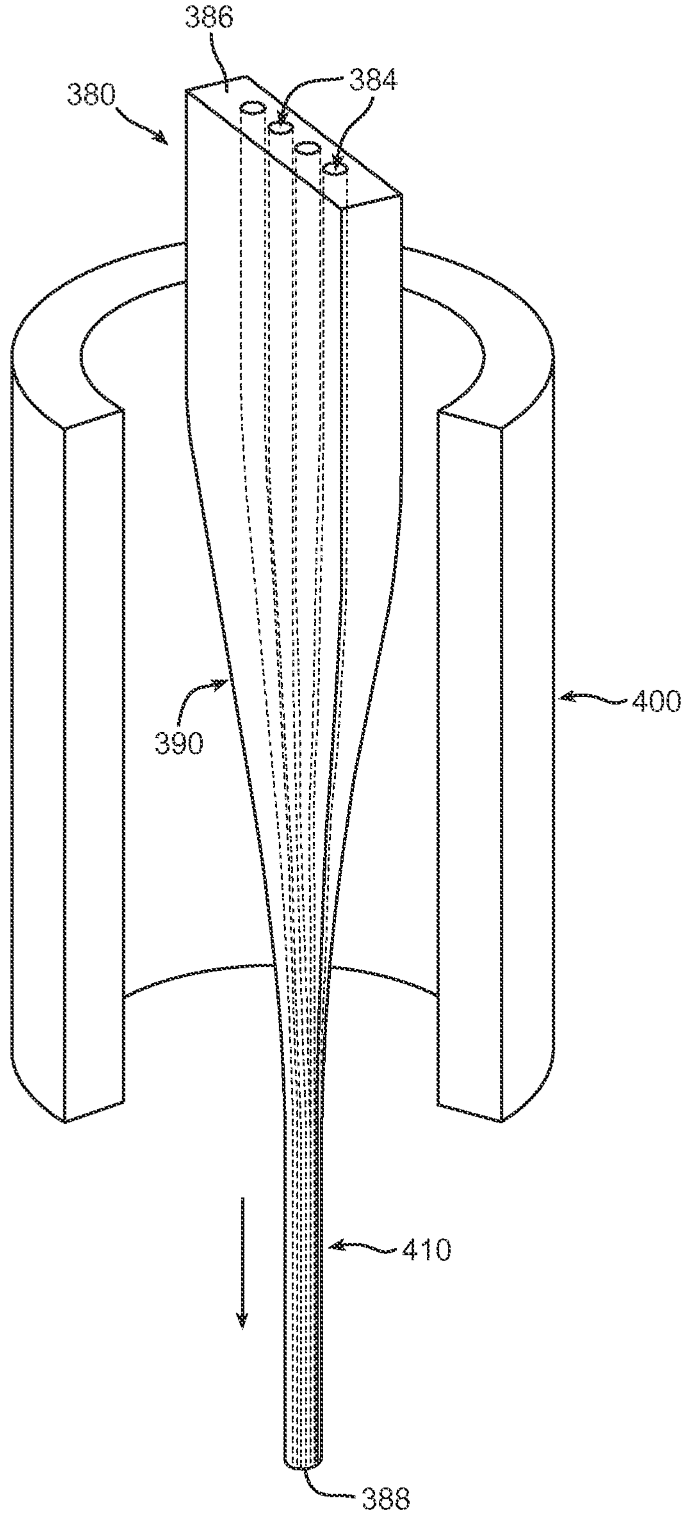
FIG. 24 is a perspective, cut-away view of the preform of FIG. 23 in a cylindrical heater, showing the heated end of the cylindrical preform being drawn into a smaller rod while preserving the channel geometry and the relative scale of the preform.
Figure 25:
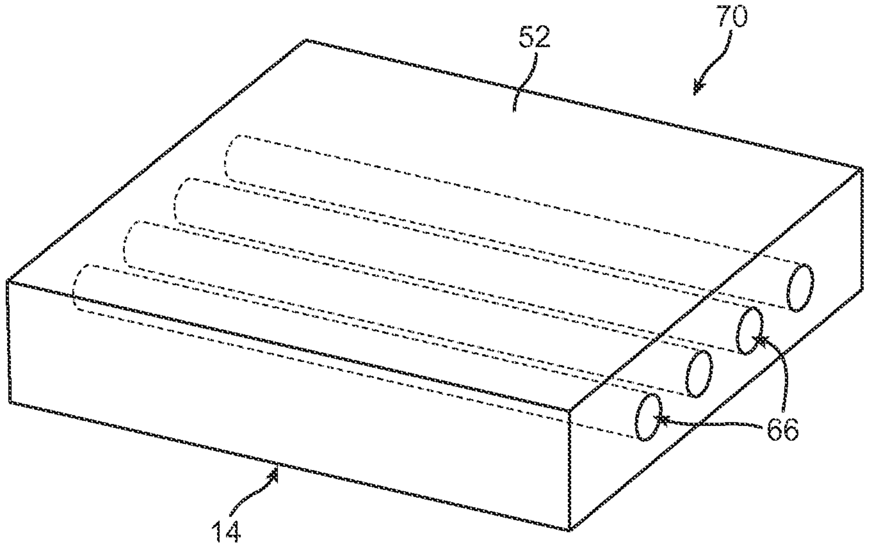
FIG. 25 is a perspective view of the drawn channeled substrate showing the array of channels formed therein.

Thus, with reference now to FIG. 24, in forming a channeled substrate 70 using glass preform 380, preform end 386 is held and at least a portion 390 of the glass preform at the free end 388 is placed in a cylindrical heater 400 and heated until the glass in portion 390 softens. Glass in softened preform portion 390 is stretched ("drawn") downward so that the preform shape and all internal channels 384 are tapered down to a smaller geometry. The relative sizes and positions of channels 384 and other preform dimensions are substantially preserved during the drawing process, resulting in the formation of a reduced-size channeled rod 410. Channeled rod 410 is then cut into a number of channeled substrate 70 having channels 66, as shown in FIG. 25. Because channeled substrate 70 of FIG. 25 is made of glass, it is transparent at the wavelengths of interest (e.g., the telecommunications wavelengths of 880 nm and 1550 nm) and thus allows for optical communication between the substrate surface and the interior channels. The upper surface of the unitary channeled substrate 70 of FIG. 25 is denoted 52 and lower surface is denoted 14 to keep the reference numbers consistent with the embodiment of the channeled substrate formed from substrate member 10 and transparent sheet 50 described above.

Figure 26:
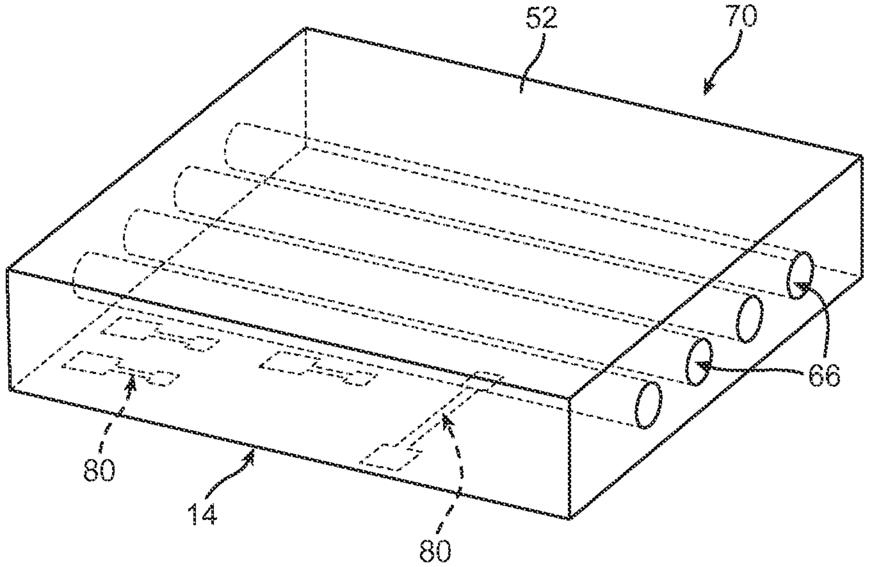
FIG. 26 is the same as FIG. 25, but shows conductive contacts on the lower surface of the channeled substrate.
Figure 27:
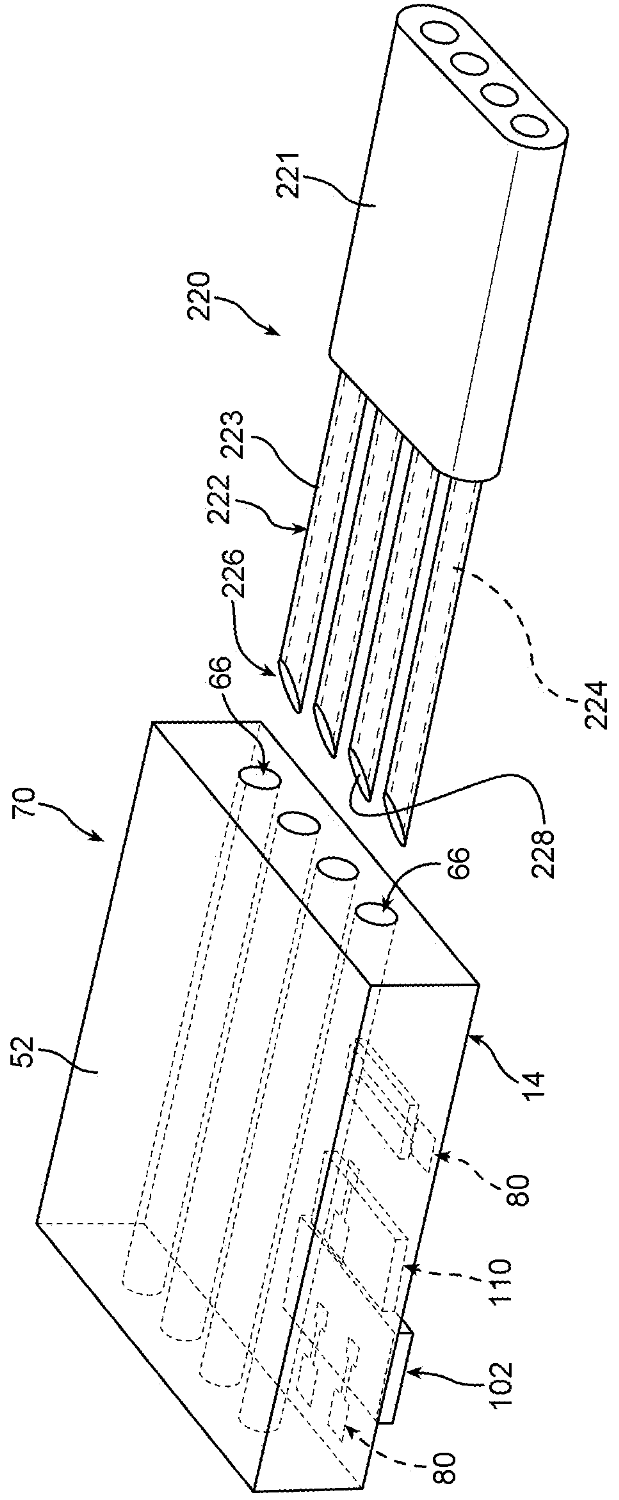
FIG. 27 is similar to FIG. 26, and shows the fiber array being inserted into the substrate channels.
Figure 28:
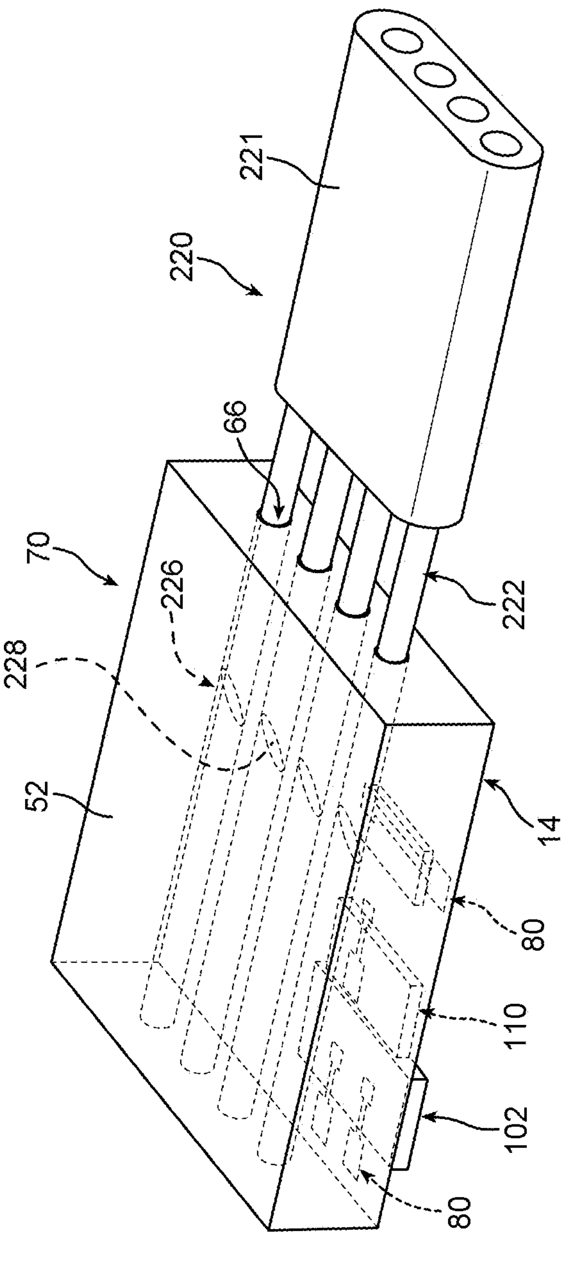
FIG. 28 is similar to FIG. 27, but shows the fiber array in place within the substrate channels.

Subsequent processing steps on channeled substrate 70 of FIG. 25 form conductive contacts 80 on channeled substrate lower surface 14 as shown in FIG. 26. Flip-chip attachment of active optical components 100 and active electrical components 102 is then carried out, with the resulting formation of the corresponding integrated optical device 202 being shown in FIG. 27. As described above and as shown in FIG. 28, fiber arrays 220 with fibers 222 having angled fiber ends 230 are then inserted into channels 66 and aligned with active optical components 100.

In an alternative assembly sequence, the channeled rod 410 is cut into longer lengths so that many channeled substrates 70 may be fabricated from a single, long rod much in the manner of the "wafer scale" fabrication methods discussed above. Following the assembly process described above, pad metallization, solder ball attachment and flip-chip attachment of components are carried out on different locations on the larger "channeled substrate" 70 to form multiple integrated optical devices 202 using channeled rod 410. Following flip-chip attachment, channeled rod 410 is then diced to form individual integrated optical devices 202, which can then optionally be integrated into a larger optical sub-assembly as described above. Other operations, such as precision polishing of one or more surfaces on the channeled rod 410 may also be carried out.

Transparent Channeled Substrates with Active Optical Components Mounted on Both Sides In some applications, active optical and electrical components 100 and 102 are mounted on opposite sides of channeled substrate member 70. For example, for a transmitter active optical component 100 such as a VCSEL, optical output power may need to be monitored with a receiver active optical component over the lifetime of the transmitter. In an example embodiment, an optically transparent channeled substrate 70 is used to flip-chip mount a receiver active optical component 100 roughly opposite to a transmitter active optical component.

Figure 29:
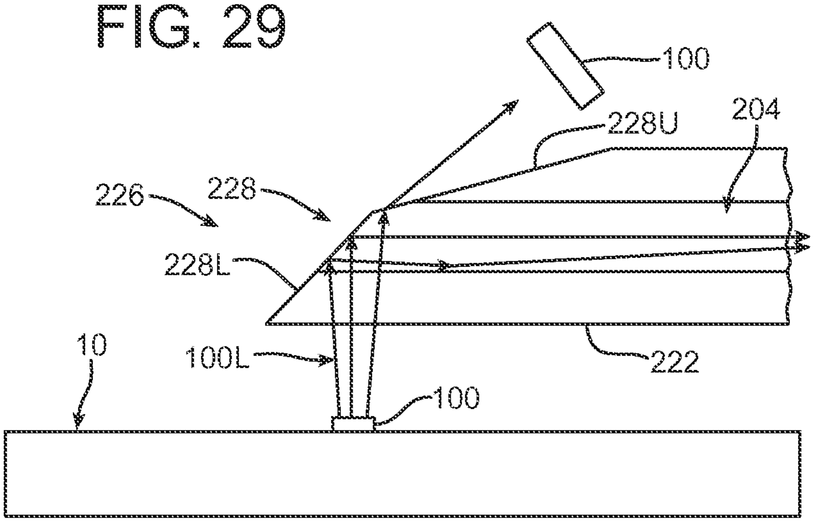
FIG. 29 is a close-up view of an example embodiment wherein the optical fiber ends include two facets that facilitate coupling of light from an active optical component into the optical fiber while also allowing for detection of a portion of the light.

FIG. 29 is a close-up view of an optical fiber 222 and its fiber end 226, which has an angled face 228 having upper and lower cleaved facets 228U and 228L that serve to split light from light beam 100L between optical fiber core 224 and a nearby photodetector active optical component 100. The lower facet 228L is formed at a relatively steep angle (relative to horizontal in FIG. 29) so that light 100L from VCSEL active optical component 100 arranged below optical fiber end 226 is totally internally reflected into fiber core 224. Upper facet 228U is formed at a more shallow angle so that a portion of light 100L refracts through this facet and onto receiver active optical component 100 arranged above optical fiber end 226.

Figure 30:
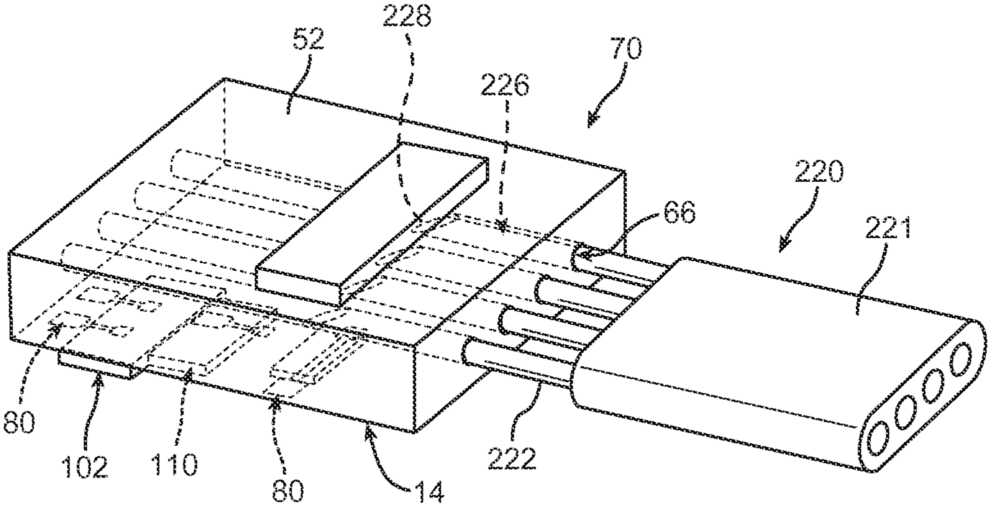
FIG. 30 is a perspective view similar to FIG. 28, but shows a receiver active optical component on one side of the channeled substrate opposite the transmitter active optical component.

In an example embodiment illustrated in FIG. 30, an array 220 of dual-faceted fibers 222 is inserted into channels 66 of channeled substrate 70. The fiber ends 226 of optical fibers 222 in optical fiber array 220 are positioned directly over a corresponding array of transmitter active optical components 100 and beneath a second array of receiver active optical components. Light 100L from the array of transmitter active optical components 100 is directed into respective fiber ends 226, with a portion of this light being reflected into optical fiber core 224 and a portion of the light being refracted upward toward receiver active optical component 100.

Other applications for channeled substrates 70 are contemplated herein, such as where all active optical components 100 are flip-chip mounted on one side of the channeled substrate. For example, in one such application, a portion of light 100L emitted from a transmitter active optical component 100 propagates through a portion of channeled substrate 70 and then reflects off one or more interior or exterior surfaces (or machined facets) before being directed to a receiver active optical component mounted adjacent to a transmitter active optical component device.

Optical Attenuation

For certain transmitter active optical components 100, such as light sources in the form of VCSEL-based transmitters, it is often desirable to operate the component at high optical output power levels. Since eye safety requirements place a limit on the maximum optical power carried in an optical link, it is sometimes necessary to attenuate the optical power launched into optical fibers 222. Control of the optical power is accomplished in one example by providing a known optical attenuation between active optical component 100 and optical fiber 222, or by positioning (i.e., selectively aligning) the optical fiber so that it only captures a fraction of the light outputted by the active optical component.

While substrate member 10, transparent sheet 50 and preform 380 may all be made from low-loss optical glass, these items may also be made of doped glass, wherein the dopants are added to the glass in quantities that alter the optical absorption characteristics of the glass while preferably not substantially altering other relevant glass properties such as CTE, thermal conductivity and electrical conductivity. In an example embodiment, substrate member 10, transparent sheet 50 and/or preform 380 are fabricated using one of a variety of doped glasses to achieve the desired optical attenuation for a given application.

In an example embodiment, transparent sheets 50 having a select thickness $T_{50}$ that has a corresponding desired attenuation that allows for introducing controlled amounts of insertion loss between optical fibers 222 and active optical components 100. One concern with this approach is whether there will be substantial optical crosstalk with adjacent optical fibers 222 as light beam 100L diverges while traveling through transparent sheet 50. Arrays 220 of optical fibers 222 are commonly arranged on pitches of 127 μm or 250 μm, so it is best that divergent light beam 100L from one active optical component 100 not spread laterally any more than about half this value. Taking a 62.5 μm lateral spread (i.e., 125 μm beam diameter) as a conservative value, then for light beam 100L of wavelength $\lambda$=850 nm and generated by an 8 μm diameter VCSEL, the light beam will spread to 125 μm after propagating through about 1.4 mm of glass. The estimated insertion loss associated with coupling into a 30 μm diameter multimode optical fiber 222 at a 1.4 mm glass thickness is about 10 dB.

For a wavelength $\lambda$=1.55 μm and 8 μm diameter VCSEL, light beam 100L will spread to 125 μm after propagating through about 0.75 mm of glass. The estimated insertion loss associated with coupling into a 30 μm diameter multimode fiber 222 at a 0.75 mm glass thickness is also about 10 dB.

Thus, for the commonly used wavelengths of $\lambda$=1.55 μm and $\lambda$=850 nm, it is possible to introduce significant signal attenuation without introducing significant signal crosstalk between optical fibers 222. If signal crosstalk is still a concern, the pitch of substrate channels 66 can be increased to larger values such as 250 μm or 500 μm. To extinguish or reduce unwanted crosstalk from additional reflections within the channeled substrate 70, in an example embodiment either antireflection coatings, absorptive coatings or scattering surface treatments are applied to the grooved substrate (when a grooved substrate is opaque) or the channeled substrate opposite face (when the grooved substrate or drawn channeled substrate is transparent).

Channels and Other Features on the Thin Glass Sheet

Figure 31:
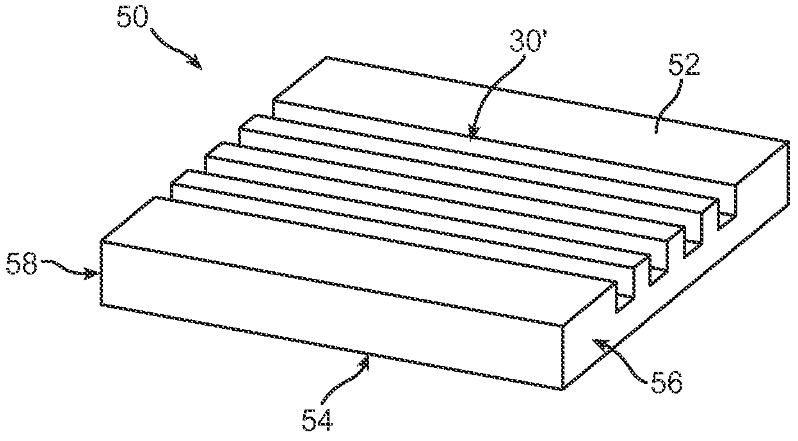
FIG. 31 is a perspective view of an example grooved transparent sheet.

In another examplary embodiment for fabricating channeled substrate 70, a slightly thicker transparent sheet 50 (e.g., 0.7 mm to about 1.1 mm) is used to increase the mechanical stability of the transparent sheet during processing. In addition, transparent sheet 50 is processed in the same or like manner as described above in connection with substrate member 10 in order to form an array of parallel grooves 30' in upper surface 52, as shown in FIG. 31. In one approach, grooves 30' are formed in transparent sheet 50 by precision sawing, such as used for forming grooves 30 in substrate 10 as described above. The formation of grooves 30' results in the formation of a thinned region 17 between groove bottom 31' and lower surface 54. In the present example embodiment, substrate member 10 is ungrooved so that grooves 30' and substrate upper surface 12 define channels 66'. Example embodiments where substrate member 10 is also grooved are described below.

After channeled transparent sheet 50 is combined with unchanneled substrate member 10 to form channeled substrate 70, loss coupling is required between active optical components 100, which are mounted on transparent sheet lower surface 54, and optical fiber ends 226 positioned in channels 66'. The thickness of thinned region 17 should be no more than about 150 μm to 250 μm, depending ostensibly on the wavelength $\lambda$ and other optical properties of active optical components 100, as well as on the diameter of (multimode) optical fiber core 224. The resulting transparent sheet 50 is prone to breaking at thinned regions 17 even under slight mechanical deformation. For example, it is generally difficult to remove grooved transparent sheet 50 from a pressure-sensitive backing sheet (not shown) commonly used in dicing without breakage of the transparent sheet.

Figure 32:
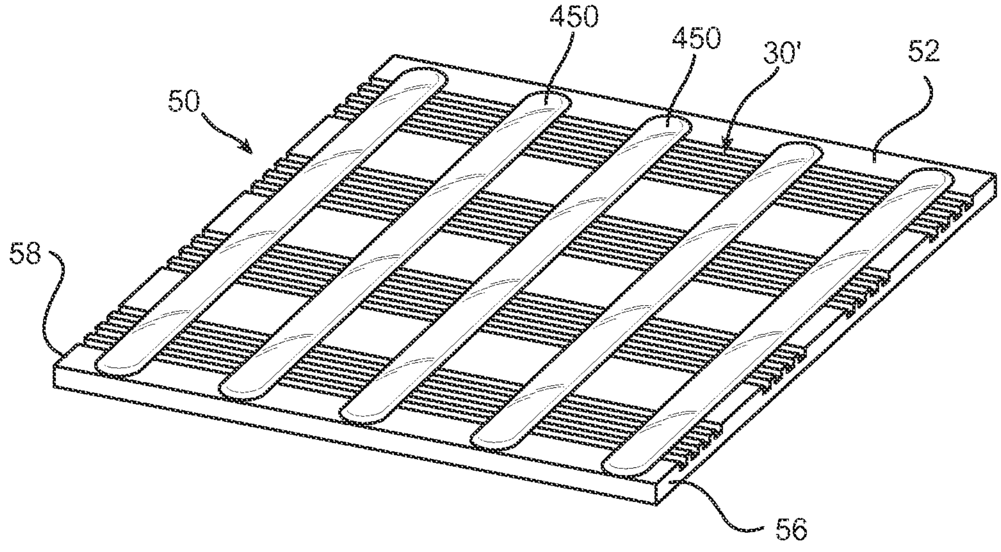
FIG. 32 is similar to FIG. 31, and shows support material deposited on the grooved surface.

To mitigate the propensity for transparent sheet 50 to break at thinned regions 17, in an example embodiment, the thin regions are reinforced by applying a small amount of support material 450, such as an epoxy, boding material or an adhesive, into selected portions of grooves 30', as illustrated in FIG. 32. Support material 450 is preferably thin enough to flow down into grooves 30' when pressure is applied from transparent sheet upper surface, but thick enough to resist flowing along the grooves. In an example embodiment, support material 450 comprises a filled CTE-matched thermal cure epoxy from the Corning MCA-xx family, which is available from Corning, Inc., Corning, N.Y.

In an example embodiment, support material 450 is applied to upper (grooved) surface 52 of transparent sheet 50 while still attached to a pressure sensitive adhesive backing (not shown). This allows transparent sheet 50 to be sufficiently reinforced to survive backing removal and handling during subsequent processing steps. The flow of support material 450 is preferably limited to specific groove locations using screen printing, automated syringe dispensing or other masking or dispensing methods. This approach allows for many parts to be fabricated on the same transparent sheet 50, thereby reducing total part cost. In an example embodiment, an additional adhesive polishing and/or lapping step is used to planarize support material 450 so it does not rise above transparent sheet upper surface 52, as shown in FIG. 33.

Figure 33:
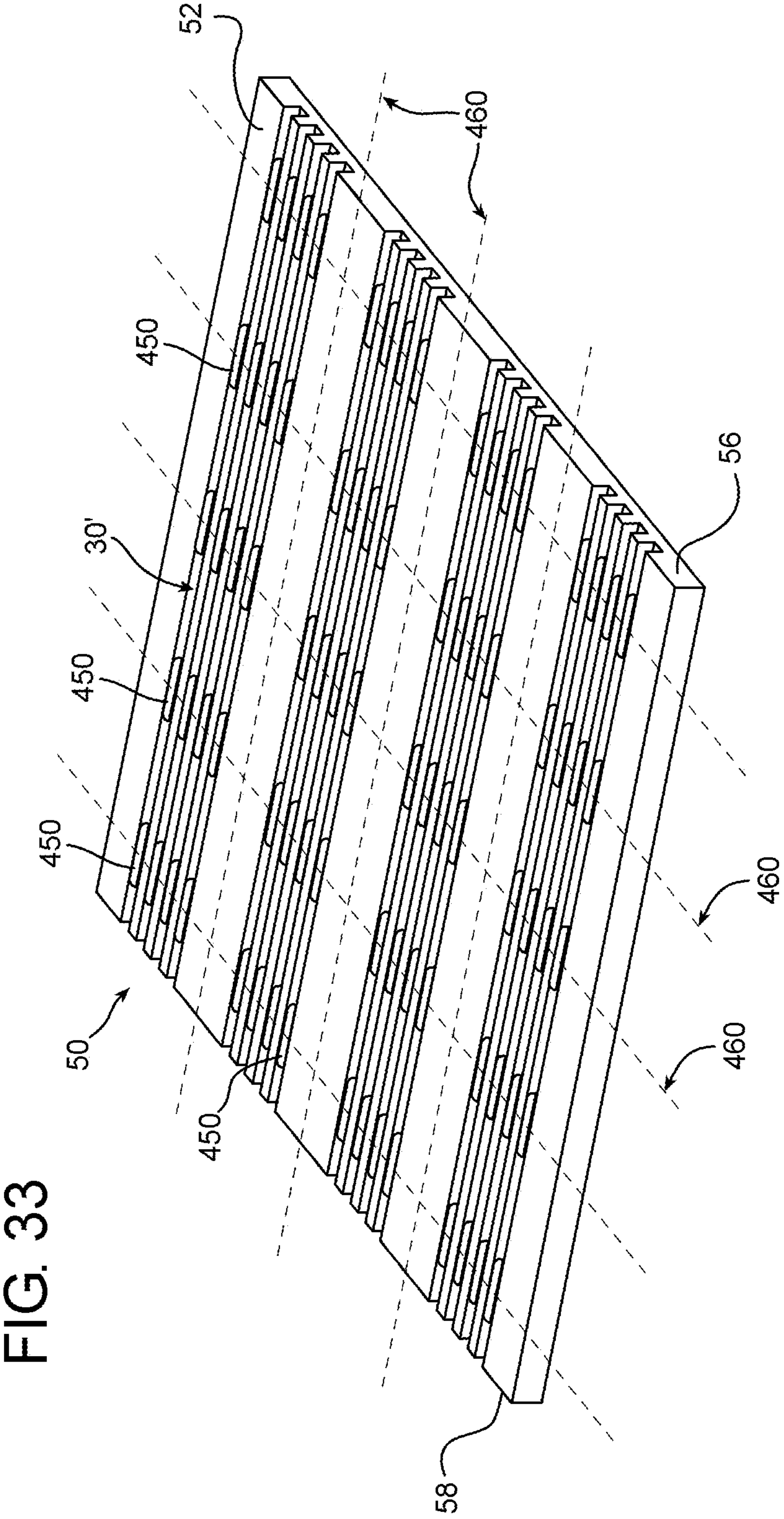
FIG. 33 is similar to FIG. 32, and shows the support material after having been planarized, and also shows dicing lines that pass through the support material.
Figure 34:
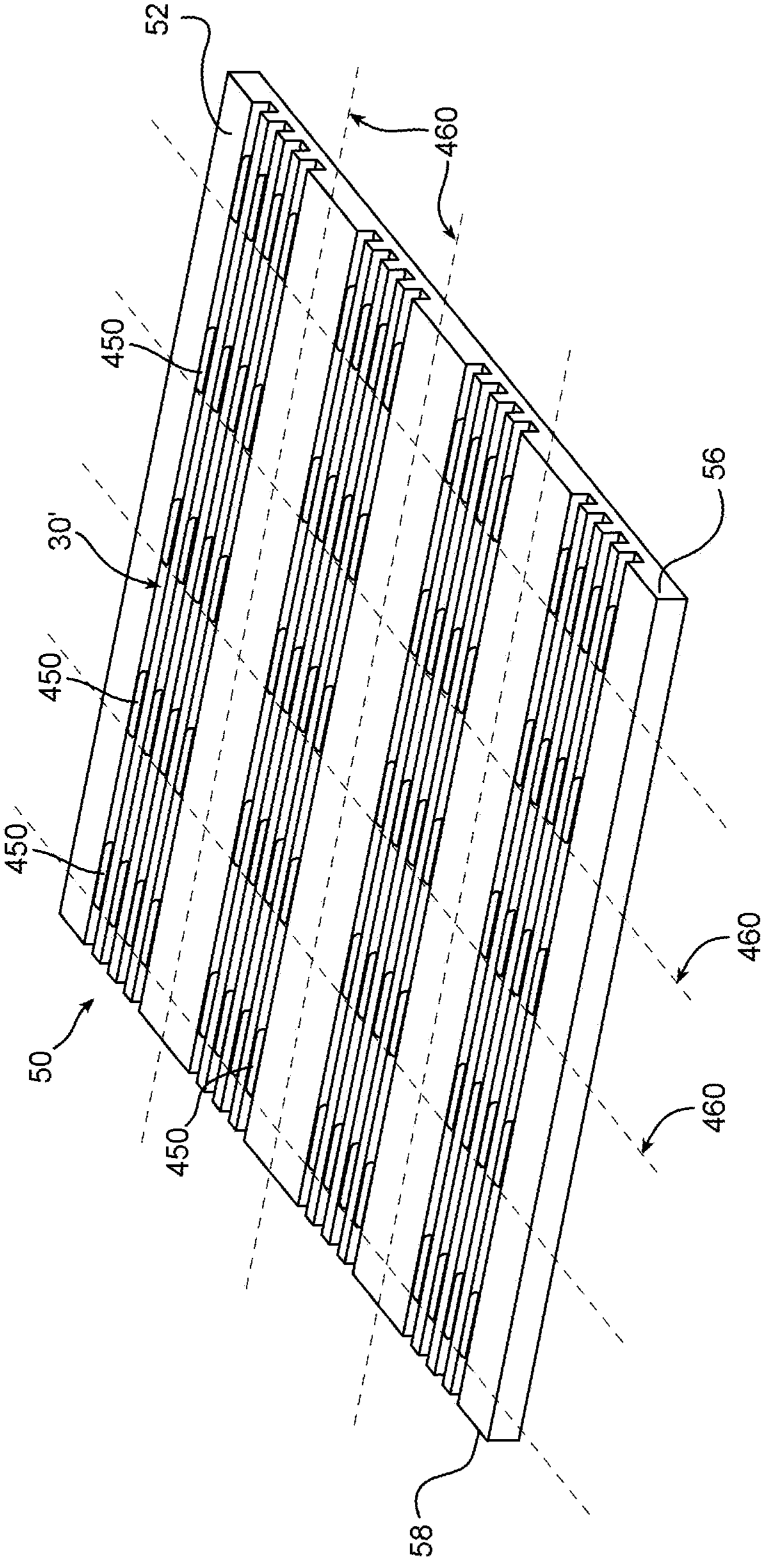
FIG. 34 is similar to FIG. 33, and shows dicing lines that do not pass through the support material.

Dicing lines 460 are also shown in FIG. 33 to indicate an example of how the larger grooved transparent sheet 50 is divided into individual transparent sheets. The dicing operation can be carried out immediately on transparent sheet 50, or delayed until after substrate member 10 is attached to the transparent sheet to form channeled substrate 70. When substrate member 10 is attached to transparent sheet 50, it provides mechanical reinforcement to thin regions 17. The dicing operation can therefore be carried out in a way that exposes the channels after dicing, such as along dicing lines 460 illustrated in FIG. 34. This enables subsequent processing similar to the steps shown in FIG. 7 through FIG. 11 to arrive at an embodiment of integrated optical device 202.

If attaching substrate member 10 to grooved transparent sheet 50 prior to dicing provides sufficient reinforcement, then the groove reinforcement steps described above can be eliminated. However, attention to thin regions 17 is required during subsequent pad metallization and flip-chip attachment to ensure that these regions are not excessively mechanically loaded.

Figure 35:
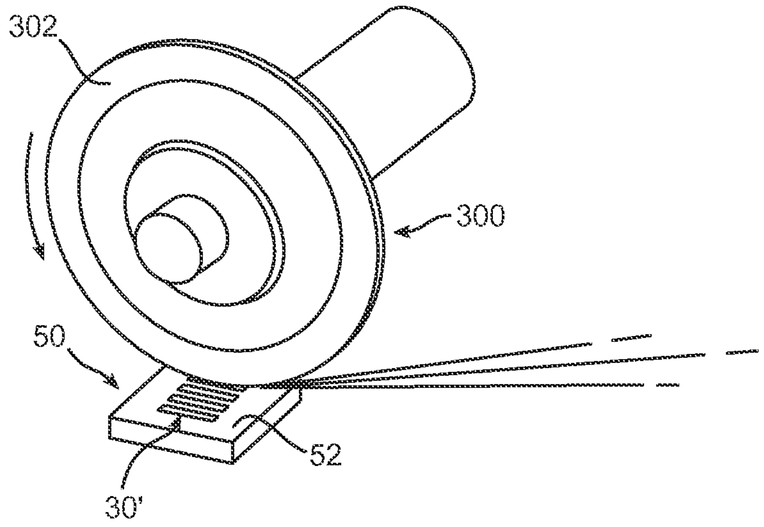
FIG. 35 is a perspective view of a thin transparent sheet having grooves formed therein by a saw.

In another example embodiment, grooves 30' do not extend between the front and back ends 56 and 58 of transparent sheet 50. Rather, shorter grooves 30' are formed, for example, by sawing into transparent sheet upper surface 52 at one or more locations, such as near the center of the transparent sheet, as shown in FIG. 35. This approach is preferably carried out on the aforementioned thicker transparent sheet 50 having a thickness of about 0.7 mm to 1.1 mm so that the portions of the transparent sheet not removed by the saw provide sufficient mechanical support to the transparent sheet during subsequent processing.

Figure 36:
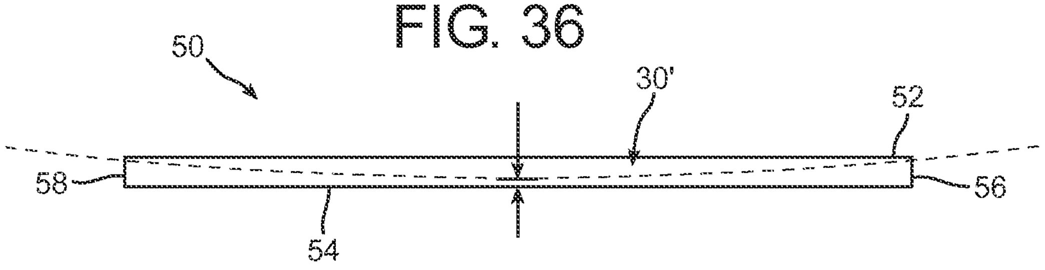
FIG. 36 is a cross-sectional view of the transparent sheet of FIG. 35, showing the curved shape of the grooves formed therein.

FIG. 36 is a schematic, to-scale cross-section view of a 10 mm wide, 0.7 mm thick transparent sheet 50 that has been plunge-sawed using a 50 mm diameter saw blade 302. Saw blade 302 is lowered until thin region 17 is about 0.2 mm thick. At this depth, saw blade 302 just touches top surface 52 of transparent sheet 50 at front and back ends 56 and 58.

Figure 37:
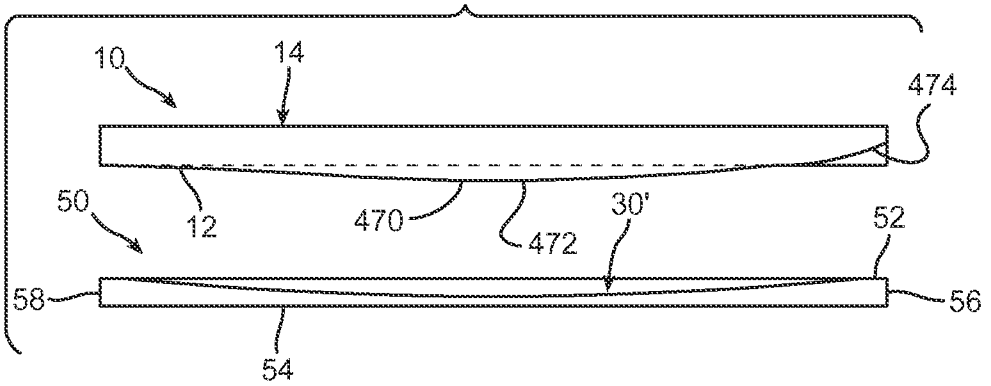
FIG. 37 is a cross-sectional view similar to FIG. 36, further showing a molded substrate member having ridges shaped to fit into the grooves of the transparent sheet to further define the channels.

In an example embodiment, molded substrate member 10 includes ridges 470 configured to fit into grooves 30' formed by the plunge-sawing operation and that serve to further define channels 66 for guiding optical fiber array 220 to the proper location, as illustrated in FIG. 37. Ridges 470 includes an angled fiber stop 472 and an enlarged (e.g., flared) fiber inlet 474 to simplify the insertion of optical fiber array 220 into channels 66.

Figure 38:
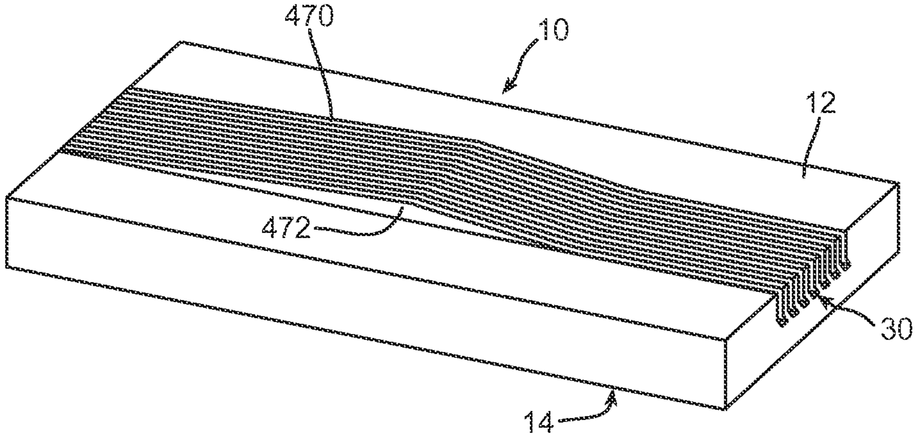
FIG. 38 is a bottom-side view of the molded substrate of FIG. 37, showing the ridges that fit into the grooves of the transparent sheet.
Figure 39:
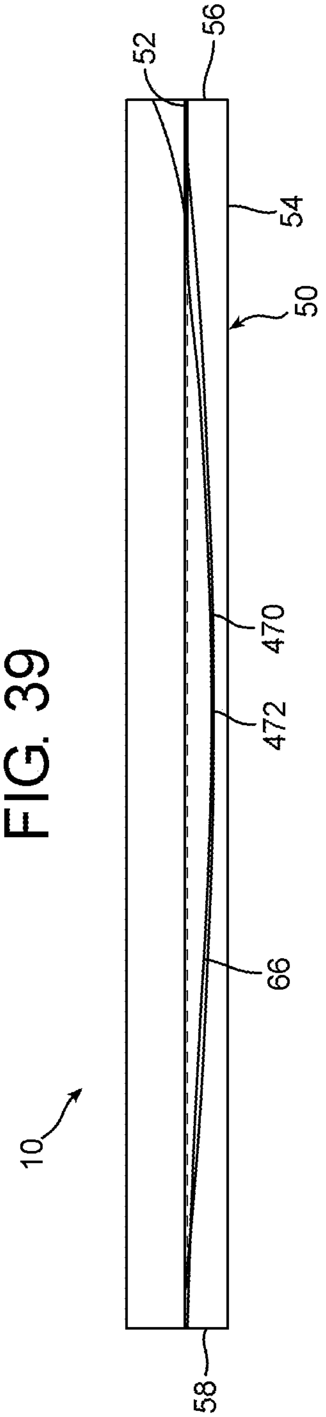
FIG. 39 shows the molded substrate mated with the transparent sheet, and showing the channel formed thereby.
Figure 40:
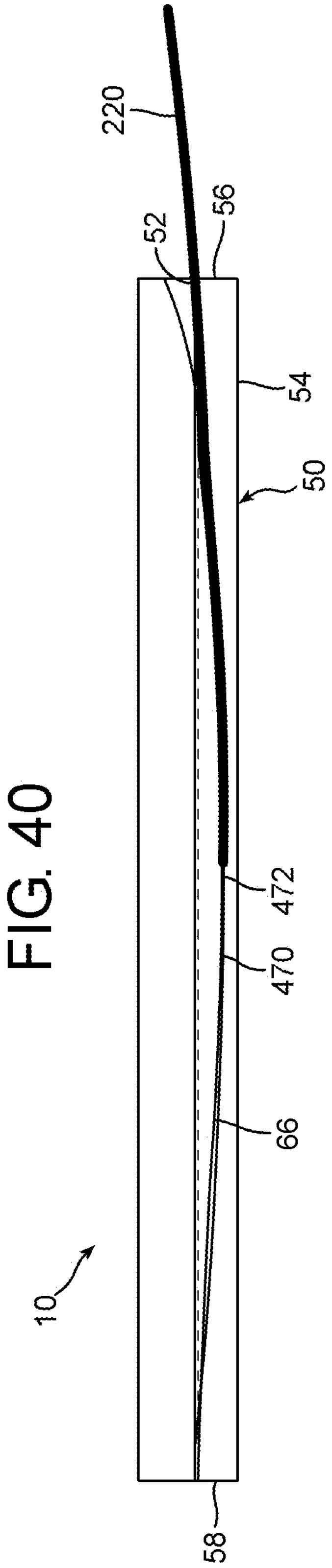
FIG. 40 is the same as FIG. 39, but showing an optical fiber in the channel defined by the molded substrate ridge and the transparent sheet grooves.

FIG. 38 provides a view of the bottom side of the molded substrate member 10 of FIG. 37, showing the raised ridges 470 that fit into the glass substrate plunge-sawed grooves 30'. An assembled cross-section view of molded substrate member 10 and transparent sheet 50 prior to fiber array insertion is shown in FIG. 39. After molded substrate member 10 and transparent sheet 50 are joined (e.g., using an adhesive), optical fiber array 220 is inserted into channels 66, as illustrated in FIG. 40. Angled fiber stop 472 ensures that angled fiber end 226 is positioned in the correct location and forced into contact with transparent sheet 50.

Many of the fabrication techniques discussed above involve removal of material from either substrate member 10 or transparent sheet 50. In other example embodiments, material is removed from both substrate 10 and transparent sheet 50 to form channels 66 defined by both grooves 30 and 30'.

Figure 42:
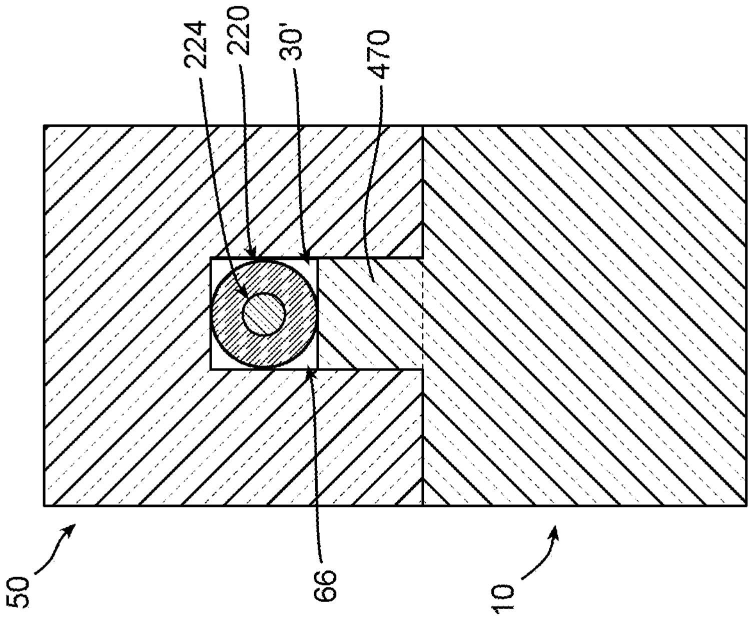
FIG. 41 through FIG. 44 are cross-sectional views of different example groove configurations for the channeled substrate.
Figure 41:
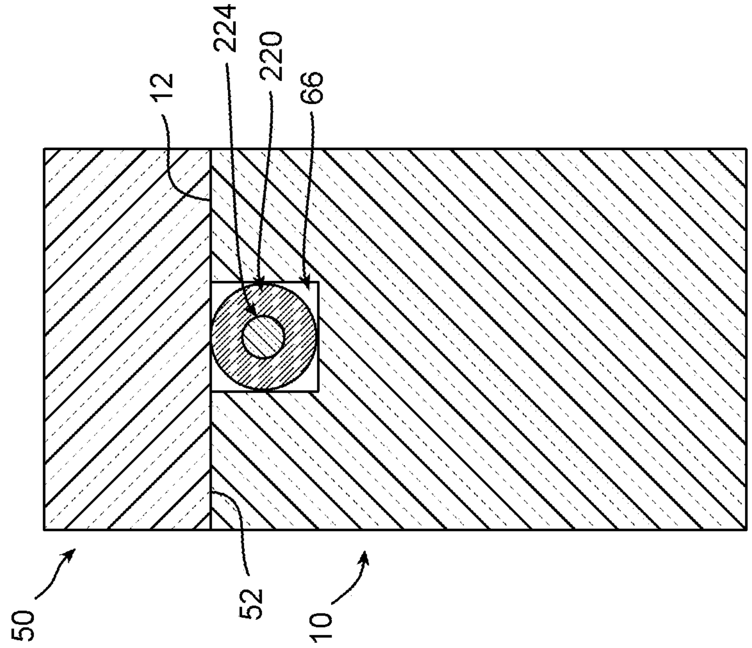
Figure 44:
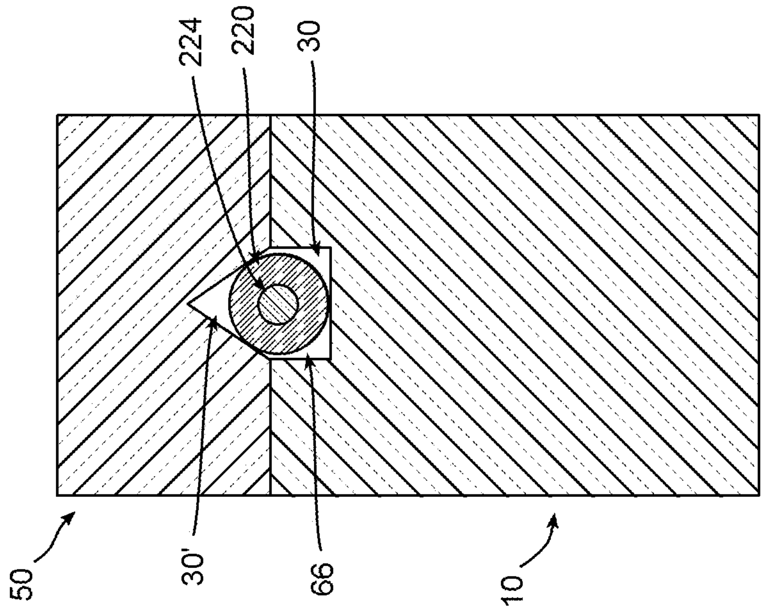
Figure 43:
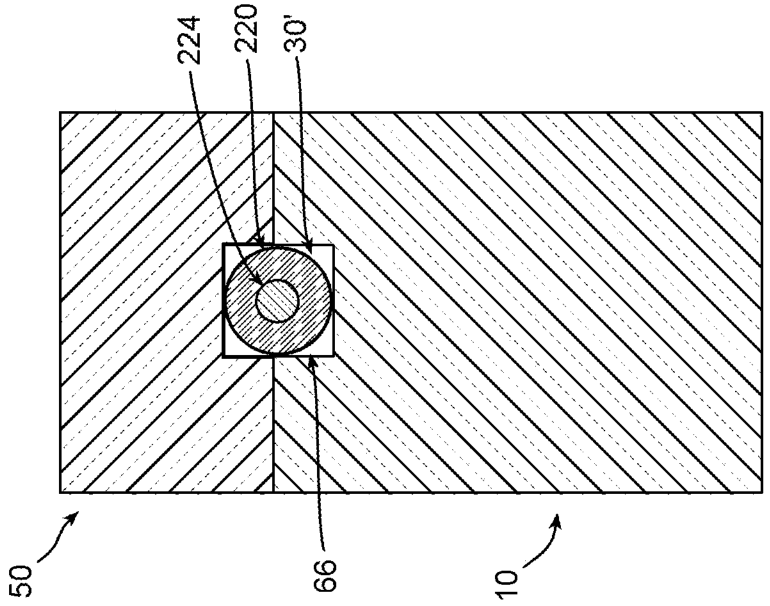

FIG. 41 through FIG. 44 show exemplary configurations for substrate member 10 and transparent sheet 50. FIG. 41 shows a channel 66 formed by removal of material only from substrate 10. FIG. 42 shows a channel 66 formed by removal of material only from transparent sheet 50 in combination with a molded substrate member 10 that has ridges 11 that fit within the transparent sheet grooves. FIG. 43 shows a channel 66 formed by removal of material from both substrate 10 and transparent sheet 50. FIG. 44 is similar to FIG. 43, except that the groove 30' is V-shaped.

Figure 45:
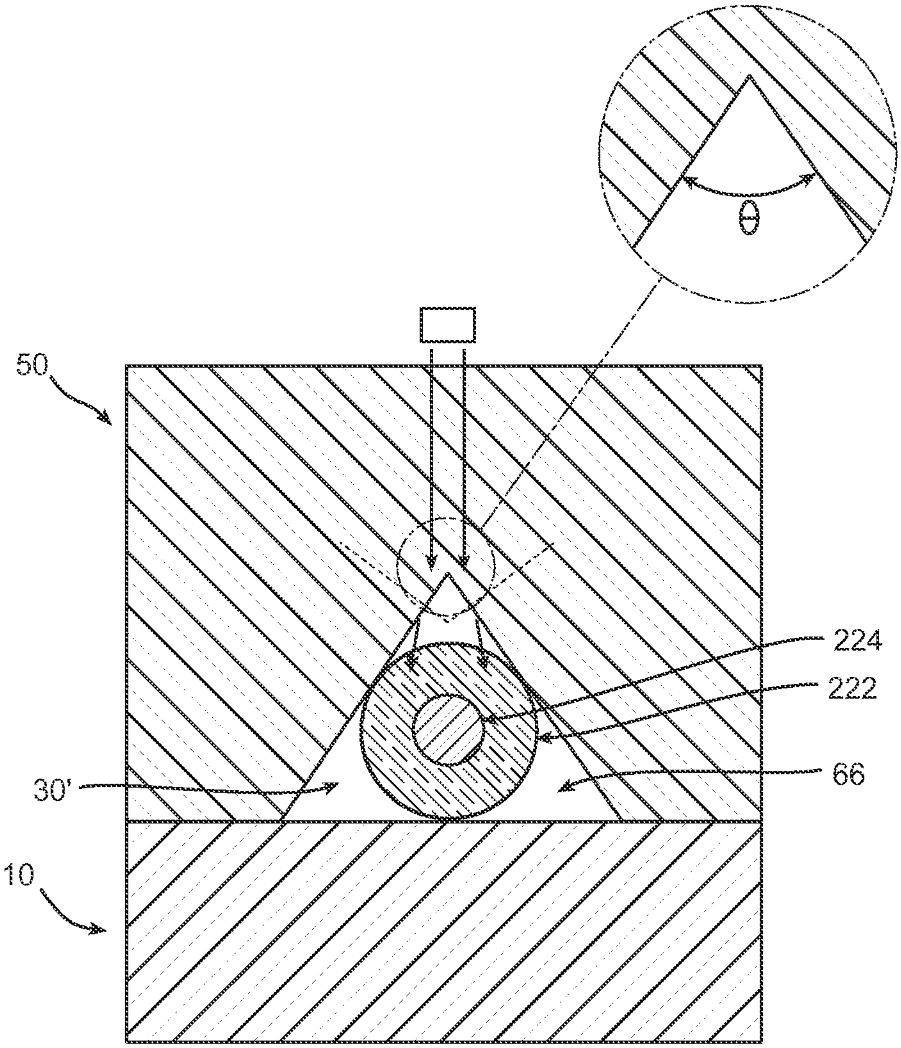
FIG. 45 and FIG. 46 are similar to FIG. 44, and show examples of two different vertex angles for the V-groove and how this angle effects light coupling between a transmitter active optical component and the optical fiber within the channel.
Figure 46:
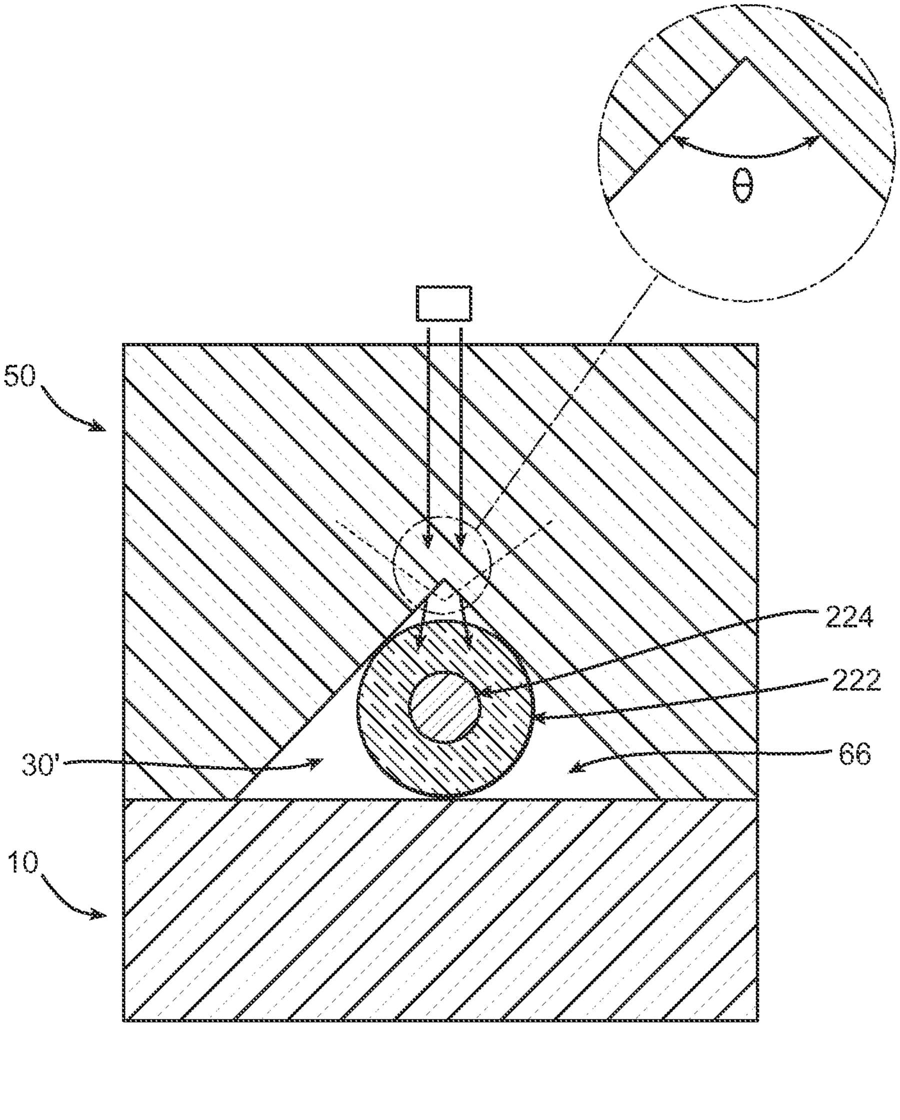

V-shaped channels 66 are an attractive option for optical fiber alignment because the vertex of the "V" allows for accurate positioning. However, a V-shaped channel 66 also has implications for efficient coupling of light in and out of the angled end 236 of optical fiber 220. FIG. 45 and FIG. 46 show two different cross-sectional views of two different V-shaped configurations for channel 66, wherein the V-shaped channel 66 is defined by a V-shaped groove 30' and the flat upper surface 12 of substrate member 10 by way of example. The "V" portion of groove 30' has a vertex angle θ. A transmitter active optical component 100 is positioned directly over optical fiber 222 adjacent lower surface 54 of transparent sheet 50 (note that now the lower surface 54 is on top of channeled substrate 70 because the upper surface has been grooved). Light from transmitter active optical component 100 propagates downward through thin region 17 and strikes the angled V-groove sidewalls 32 directly above optical fiber 222.

The orientation of V-groove sidewalls 32 causes light beam 100L from transmitter active optical component 100 to diverge as it passes through the V-groove. This divergence laterally broadens light beam 100L, causing a portion of the light beam to miss optical fiber core 224. The amount of divergence of light beam 100L depends on vertex angle θ. In FIG. 45, V-groove 30' has a relatively small vertex angle θ so that light beam 100L strikes the V-groove sidewalls 32 at a relatively high incidence angle. This leads to refraction at an even higher incidence angle via Snell's law. Since the V-groove vertex angle θ is small, the distance between the portion of the V-groove sidewall 32 where light is incident and optical fiber outer surface 223 is large. The longer distance means light beam 100L has more opportunity to diverge, which increases the likelihood that at least a portion of the light beam will not enter optical fiber core 224.

In FIG. 46, V-groove 30' has a vertex angle θ that is larger than that shown in FIG. 44. This reduces the incidence angle of light passing through the V-groove sidewall 32, thereby reducing the rate of light beam divergence compared with the configuration of FIG. 44. Since the V-groove vertex angle θ is larger than shown in FIG. 44, the distance between the portion of the V-groove sidewall 32 where light beam 100L is incident and optical fiber outer surface 223 is reduced. This smaller distance means that light beam 100L has less opportunity to diverge, which reduces the likelihood that at least a portion of the light beam will not enter optical fiber core 224.

A similar light beam divergence situation occurs when light beam 100L is launched upward from angled fiber end 226 into a receiver active optical component 100 mounted adjacent lower surface 54 of transparent substrate 50. The V-groove vertex angle θ can be used to modify the beam divergence, and larger V-groove vertex angles θ are preferable for minimizing beam divergence for this geometry.

In an example embodiment, divergence of light beam 100L is controlled to maximize link bandwidth in multimode optical fiber links. Modal dispersion in multimode optical fibers can be reduced by preferentially exciting limited sets of guided modes or guided-mode groups. In particular, excitation of higher-order guided modes can be achieved by launching light into multimode optical fiber core 224 at a high angle relative to the optical fiber axis A1. As long as the launch angle is less than the optical fiber's cut-off angle, light is guided within the optical fiber in a limited number of high order modes, resulting in reduced modal dispersion and increased link bandwidth for longer links (e.g., >200 m).

In one example, light from light beam 100L is preferentially launched into optical fiber core 224 at higher angles using the V-groove shaped groove 30' shown in FIG. 43. The V-groove vertex angle θ is adjusted to enhance the high-angle launch conditions. In some cases, it may be necessary to reduce the transparent sheet thickness $T_{50}$, since highly divergent portions of light beam 100L are more likely to fall outside of optical fiber core 224.

In an example embodiment, the V-configuration of groove 30' is used at the receiver end of an optical link, where the divergence of light beam 100L associated with V-groove 30' serves as an angular filter and only allows for high-order mode light to propagate and reach the photodetector (not shown). Low-order-mode light, which propagates roughly parallel to optical fiber axis A1 prior to reaching angled face 228 tends to be directed to locations other than a flip-chip mounted receiver active optical component 100 by the angled V-groove sidewall surfaces.

Figure 47:
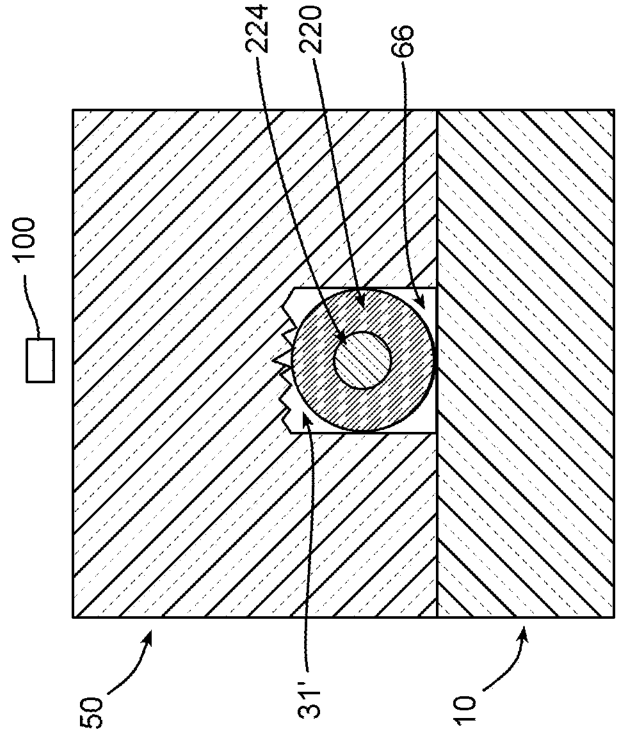
FIG. 47 and FIG. 48 are similar to FIG. 44 and FIG. 46, and illustrate an example embodiment where scattering at the bottom of the transparent substrate groove is used to couple light from a transmitter active optical component into the optical fiber within the channel.
Figure 48:
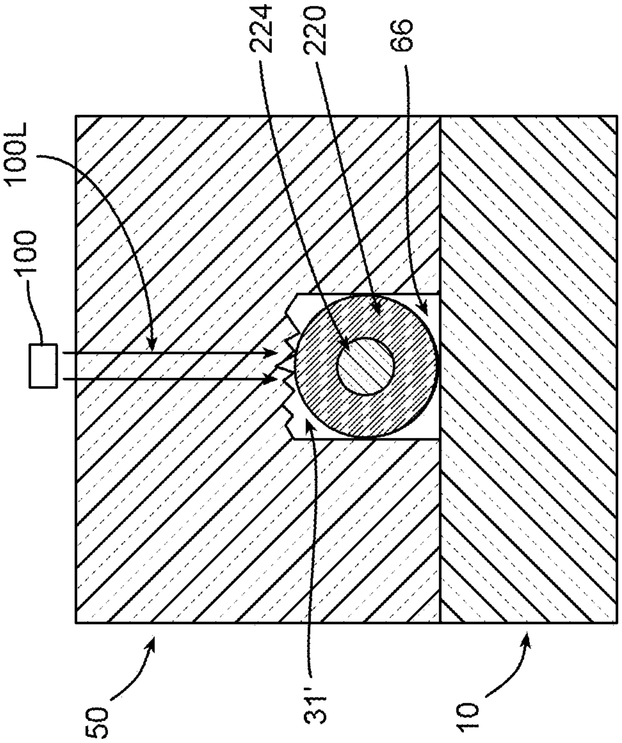

In another example embodiment, light from light beam 100L is launched into higher-order modes of optical fiber 222 by using a scattering surface interposed between the transmitter active optical component 100 and optical fiber 222. When groove 30' is formed using a saw, its bottom surface 31' has some degree of roughness due to variations in saw blade 302. FIG. 47 and FIG. 48 show an exaggerated bottom rough surface 31'. When light beam 100L is launched by transmitter active optical element 100, it strikes roughened surface 31' and scatters over a range of scattering angles ϕ relative to the initial light beam propagation direction. If a large portion of light beam 100L is scattered at a moderate scattering angle ϕ, the scattered portion will tend to excite higher-order modes of optical fiber 222, yielding improved link bandwidth performance.

In an example embodiment, the roughness of groove bottom surface 31' is modified by changing the material for saw blade 302 and treating or dressing the blade surface prior to cutting. In an example embodiment, complex saw blade profiles, such as convex or concave profiles, are used to further enhance the launch conditions and scattering angles ϕ.

Figure 49:
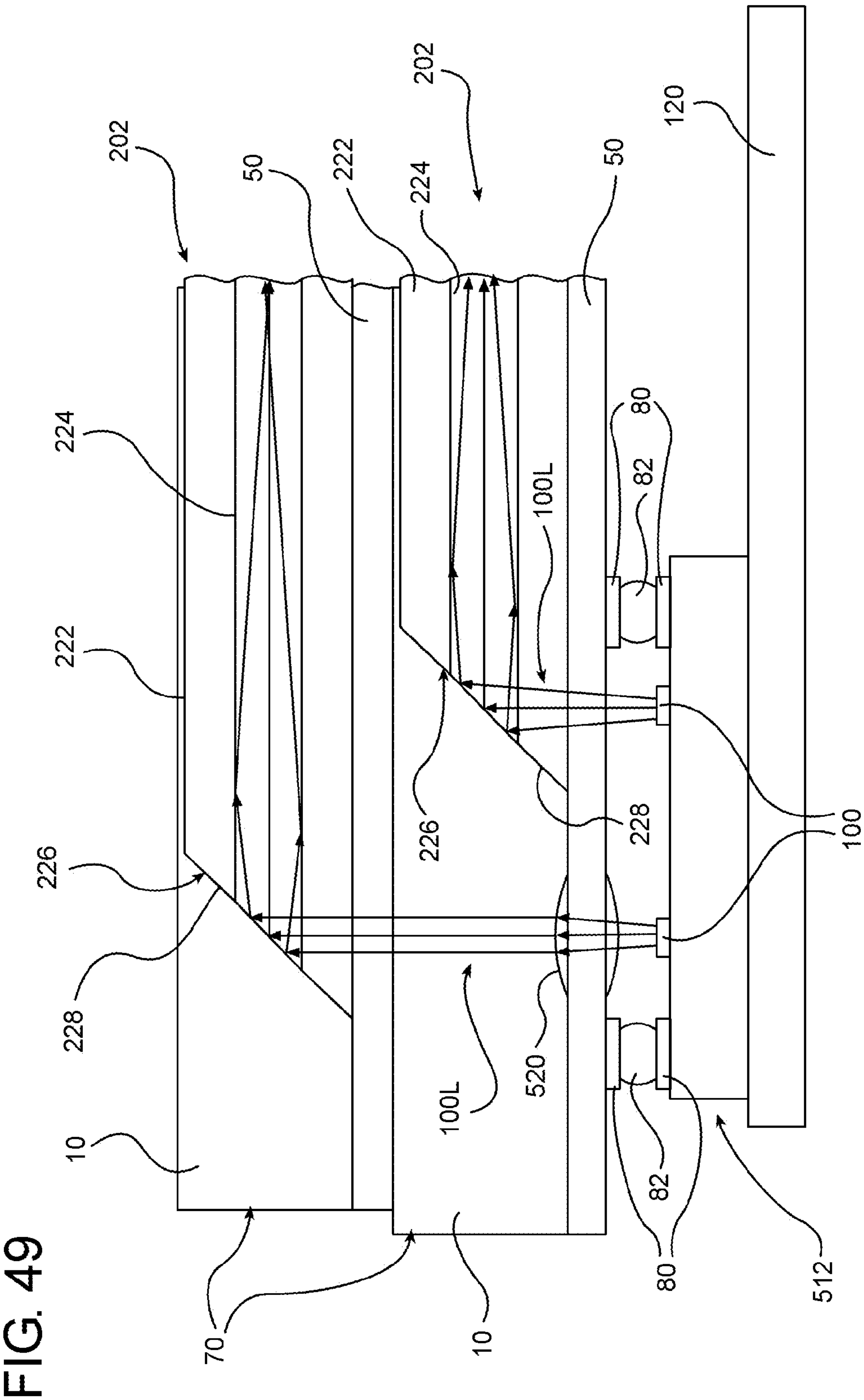
FIG. 49 is a cross-sectional view of an example printed circuit board (PCB) assembly that includes stacked integrated optical devices configured in combination with transmitter active optical components that are part of a transmitter assembly.

The example embodiments described above are extendable to two-dimensional channeled substrate configurations. FIG. 49 is a cross-sectional view of an example PCB assembly 204 that includes two-dimensional ("stacked") integrated optical devices 202 configured in combination with transmitter active optical components 100, which are part of a transmitter assembly 512. Transmitter assembly 512 includes conductive contacts 80 and solder balls 82 that provide electrical connection to the adjacent channeled substrate 70, which also includes conductive contacts.

In an example embodiment, multiple grooved transparent sheets 50 (or channeled substrates 70) are stacked and used to align two-dimensional optical fiber arrays 220 to two-dimensional arrays of active optical components 100 on one more flip-chip mounted substrate assemblies. Grooves 30 may be formed on one or both sides of the grooved substrate 70, and stacked and covered with thin glass sheets 50 where appropriate. Lenses such as lens 520 are optionally included along the optical path to compensate for increased beam diffraction in the fiber-to-active device interconnection. FIG. 49 shows a lens 520 associated with the uppermost channeled substrate 70. Lenses 520 may also be used to couple light 100L into optical fiber 222 of lower channeled substrate 70. Lenses 520 may be formed via micro-molding or laser forming Lenses 520 may also include diffractive grating structures. The focal length of lenses 520 at various stacked fiber array planes are preferably customized to optimize optical coupling performance for individual fiber arrays.

It will be apparent to those skilled in the art that various modifications to the preferred embodiment of the disclosure as described herein can be made without departing from the spirit or scope of the disclosure as defined in the appended claims. Thus, it is intended that the present disclosure covers the modifications and variations of this disclosure provided they come within the scope of the appended claims and the equivalents thereto.

What is claimed is:

1. A channeled substrate for forming integrated optical devices that employ one or more optical fibers and an active optical component, comprising:

a substrate member having a planar upper surface; and a transparent sheet having one or more grooves formed therein and fixed to the substrate upper surface to define, in combination with the planar substrate upper surface, one or more channels each comprising the planar substrate inner surface as a channel wall and each sized along its length to accommodate, along the length of each of the one or more channels, the entire cross-sectional area of one of the one or more optical fibers to allow for optical communication through the transparent sheet between the active optical component and the one or more optical fibers.

2. The channeled substrate of claim 1, wherein the transparent sheet comprises glass.

3. An integrated optical device, comprising:

the channeled substrate of claim 1;

conductive contacts formed on an upper surface of the transparent sheet;

at least one active optical component operably arranged on the conductive contacts; and the one or more optical fibers disposed in the corresponding one or more channels, wherein the one or more optical fibers have respective angled ends positioned and configured to allow light to travel between the one or more optical fibers and the at least one active optical component.

4. The channeled substrate of claim 1, wherein ends of the one or more optical fibers are substantially aligned with the active optical component.

* * * * *